(12) United States Patent
Takeuchi

(10) Patent No.: US 6,515,955 B2
(45) Date of Patent: Feb. 4, 2003

(54) OBJECTIVE OPTICAL SYSTEM FOR OPTICAL PICK-UP

(75) Inventor: Shuichi Takeuchi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/833,612

(22) Filed: Apr. 13, 2001

(65) Prior Publication Data

US 2001/0050894 A1 Dec. 13, 2001

(30) Foreign Application Priority Data

Apr. 14, 2000 (JP) ........................................ 2000-113061
Apr. 14, 2000 (JP) ........................................ 2000-113062

(51) Int. Cl.$^7$ ................................................. G11B 7/00
(52) U.S. Cl. ............................... 369/112.08; 369/44.23; 369/112.23
(58) Field of Search ...................... 369/44.11, 44.12, 369/44.23, 44.25, 112.01, 112.08, 112.13, 112.2, 112.23, 112.26

(56) References Cited

U.S. PATENT DOCUMENTS

| | | |
|---|---|---|
| 5,321,550 A | 6/1994 | Maruyama et al. |
| 5,796,520 A | 8/1998 | Maruyama |
| 5,838,496 A | 11/1998 | Maruyama et al. |
| 5,883,744 A | 3/1999 | Maruyama |
| 6,088,322 A | 7/2000 | Broome et al. |
| 6,118,594 A | 9/2000 | Maruyama |
| 6,191,889 B1 | 2/2001 | Maruyama |
| 6,349,083 B1 * | 2/2002 | Kiriki et al. ............ 369/112.23 |
| 6,370,103 B1 * | 4/2002 | Yamazaki et al. ...... 369/112.08 |

FOREIGN PATENT DOCUMENTS

JP 11337818 12/1999

* cited by examiner

Primary Examiner—Muhammad Edun
(74) Attorney, Agent, or Firm—Greenblum & Bernstein, P.L.C.

(57) ABSTRACT

Disclosed is an objective optical system for an optical pick-up that converges a light beam whose wavelength is shorter than F-line onto an information layer of an optical disc. The objective optical system consists of a refractive lens on which the diffractive lens structure is formed and satisfies the following condition (1);

$$1/(\nu^3 \times \lambda \times 10^{-6}) < 0.0045 \qquad (1)$$

where $\nu$ is an Abbe number and $\lambda$ is a working wavelength (unit: nm).

At least one surface of the refractive lens is formed as an aspherical surface whose radius of curvature increases as a height from the optical axis becomes large. The diffractive lens structure has a plurality of concentric ring-shaped steps to correct chromatic aberration caused by the refractive lens.

10 Claims, 33 Drawing Sheets

SPHERICAL ABERRATION SA
SINE CONDITION SC

SPHERICAL ABERRATION
CHROMATIC ABERRATION

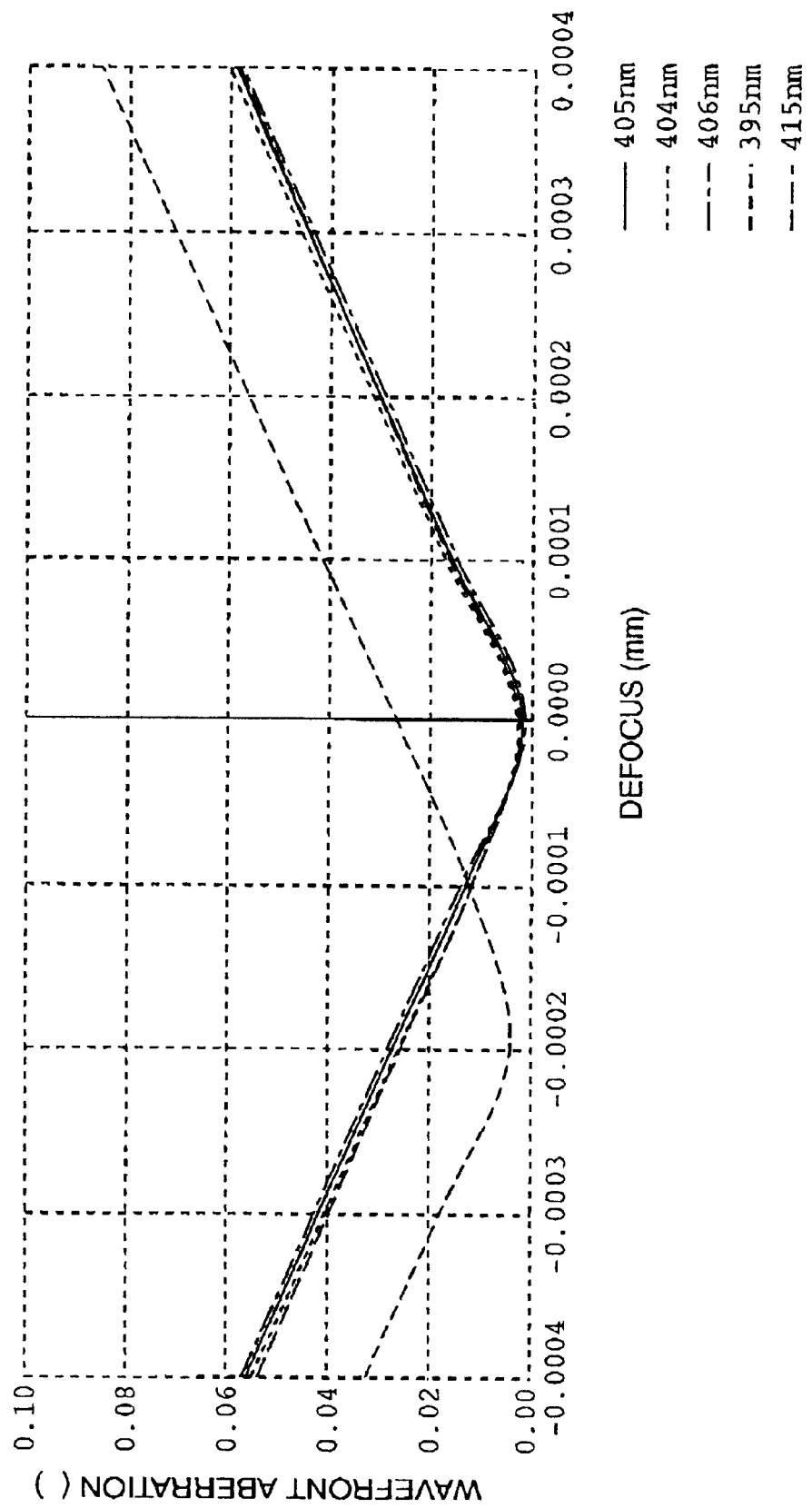

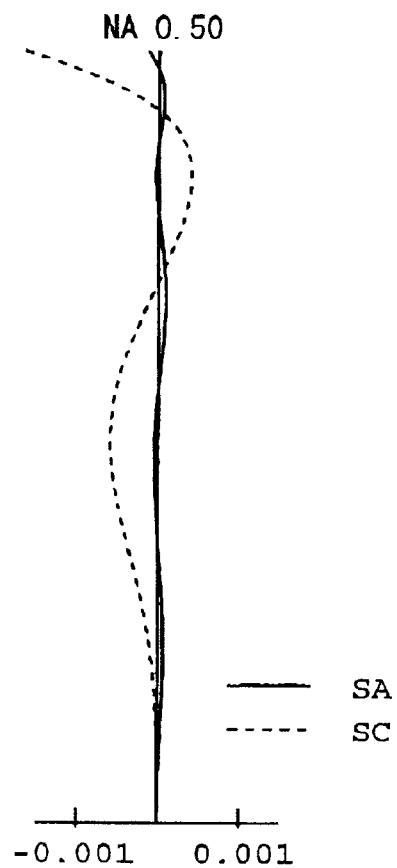 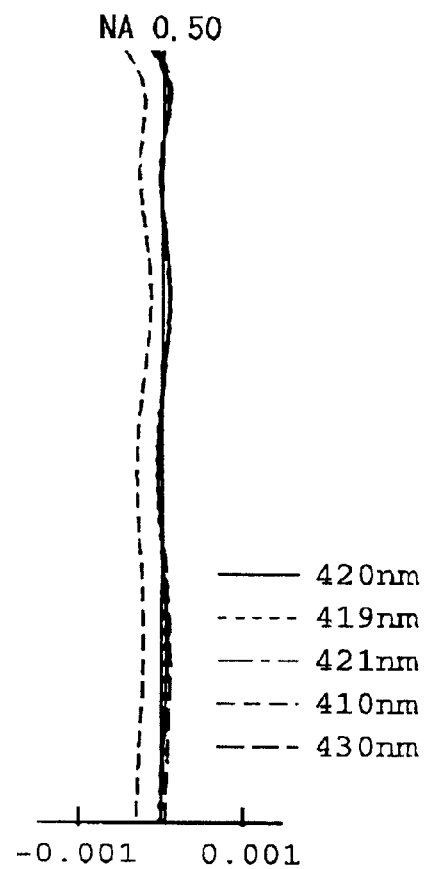
FIG. 5A
NA 0.50
— SA
---- SC
SPHERICAL ABERRATION SA
SINE CONDITION SC
FIG. 5B
NA 0.50
— 420nm
---- 419nm
— — 421nm
—--- 410nm
— — 430nm
SPHERICAL ABERRATION
CHROMATIC ABERRATION

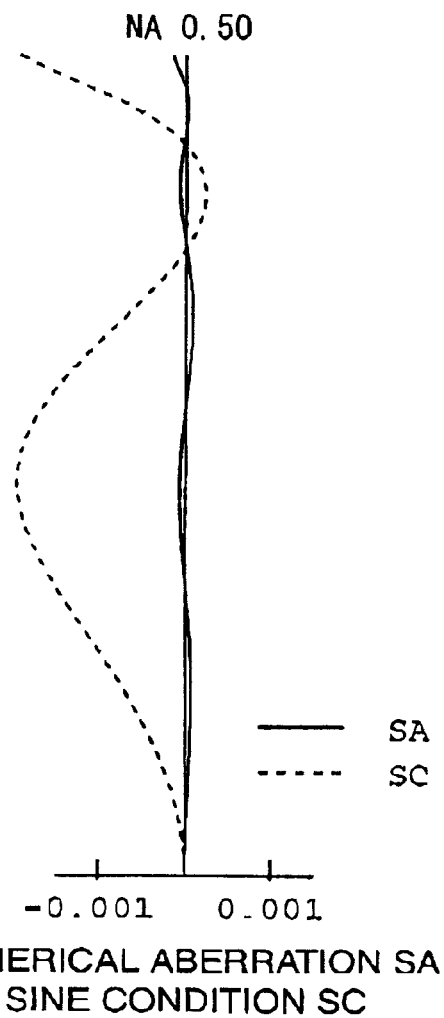
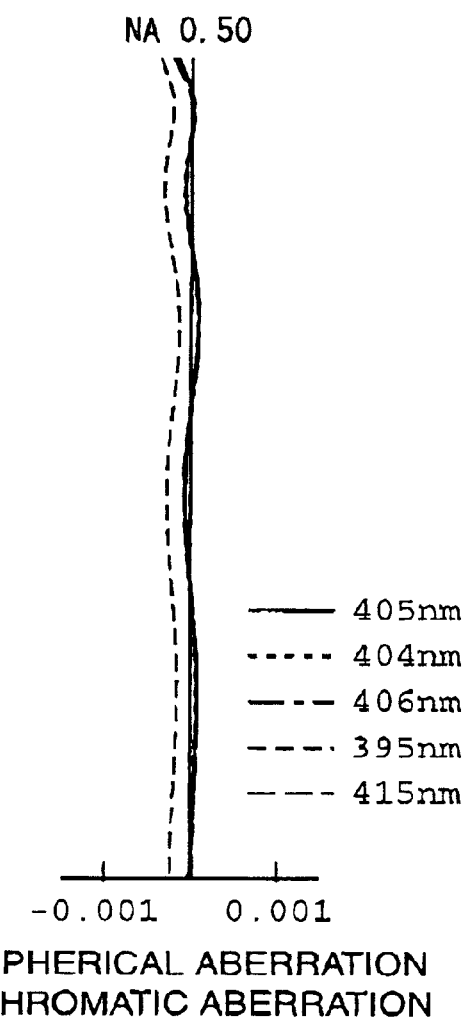
FIG. 7A
SPHERICAL ABERRATION SA
SINE CONDITION SC
FIG. 7B
SPHERICAL ABERRATION
CHROMATIC ABERRATION

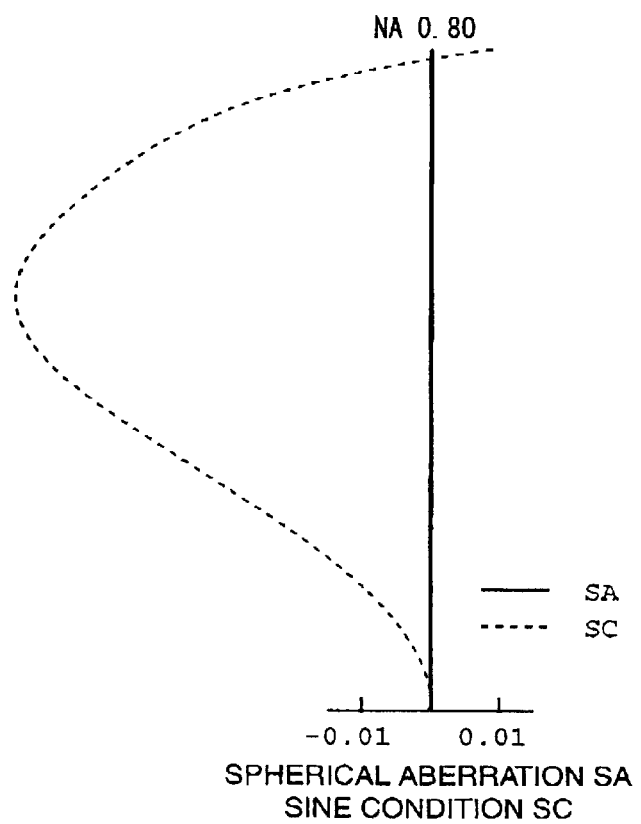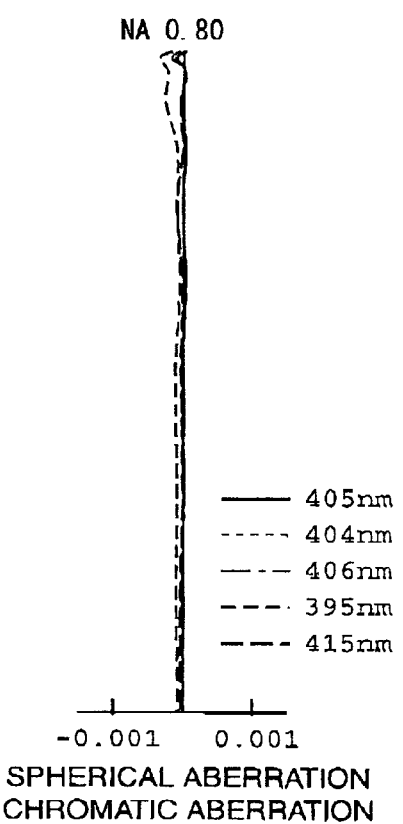

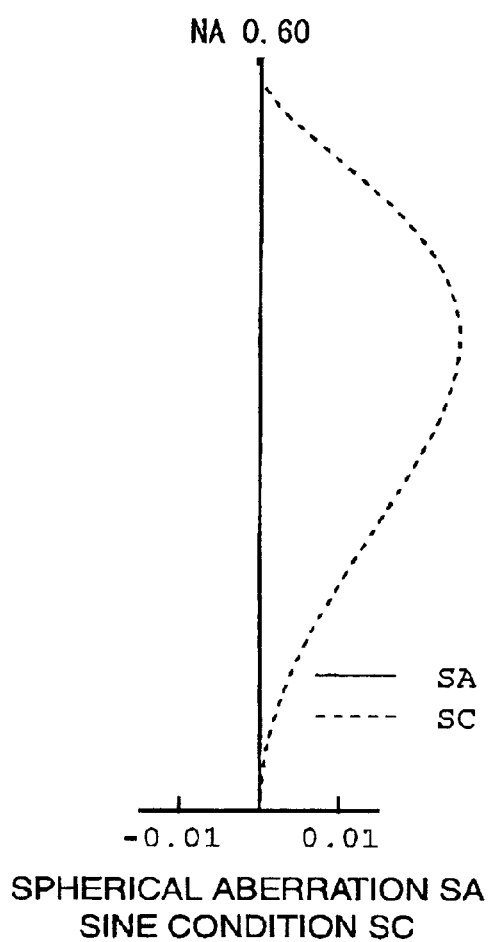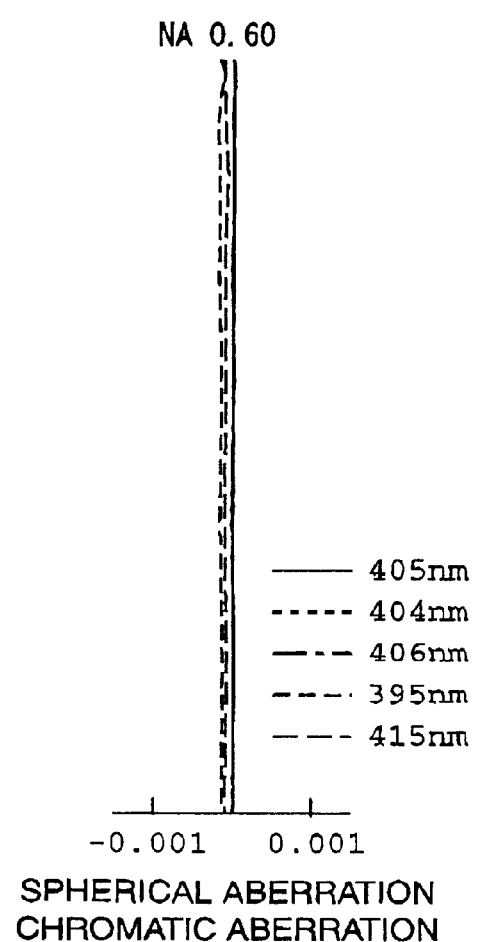

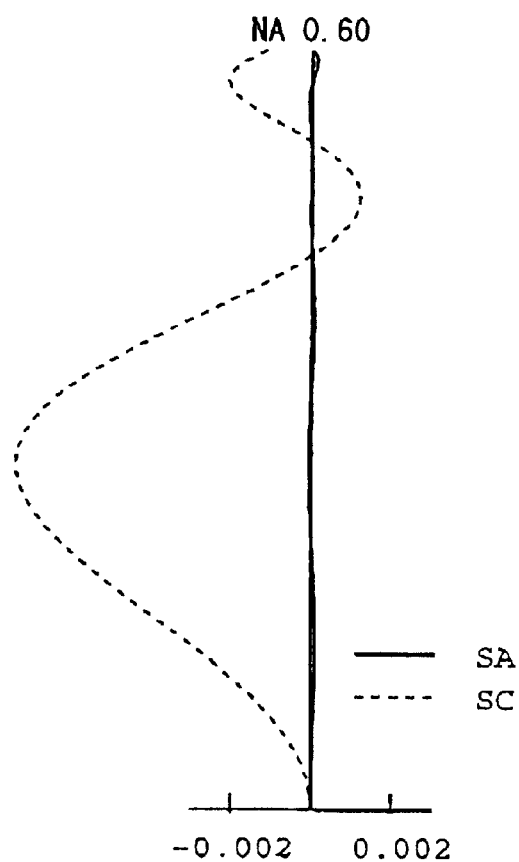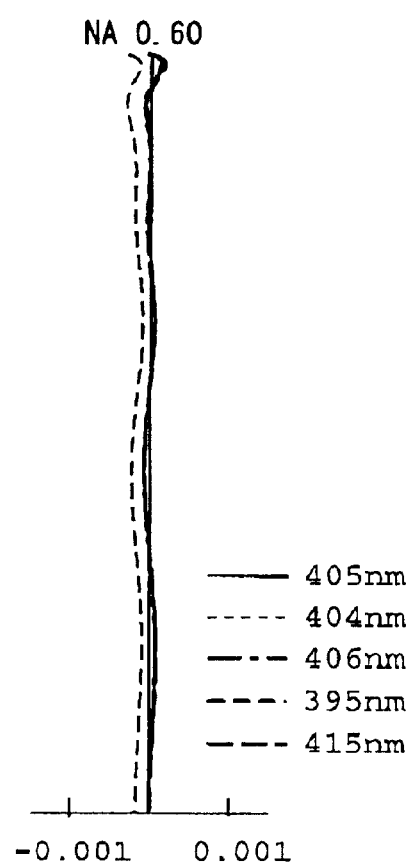

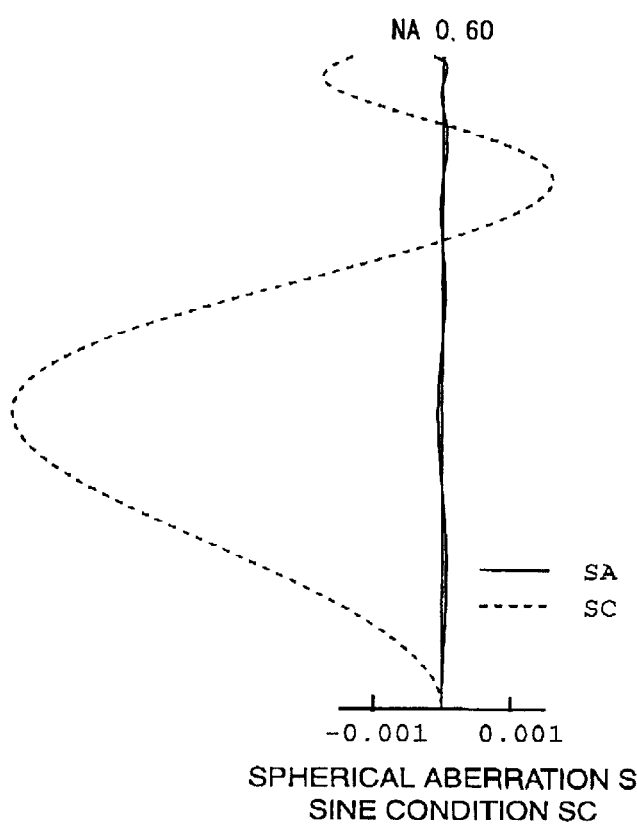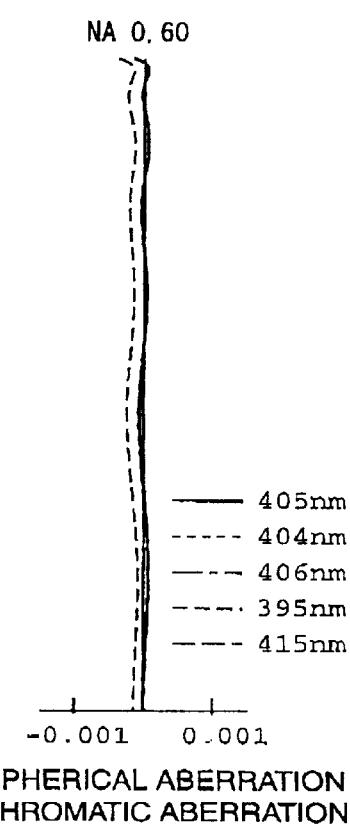
FIG. 21A — SPHERICAL ABERRATION SA SINE CONDITION SC
FIG. 21B — SPHERICAL ABERRATION CHROMATIC ABERRATION

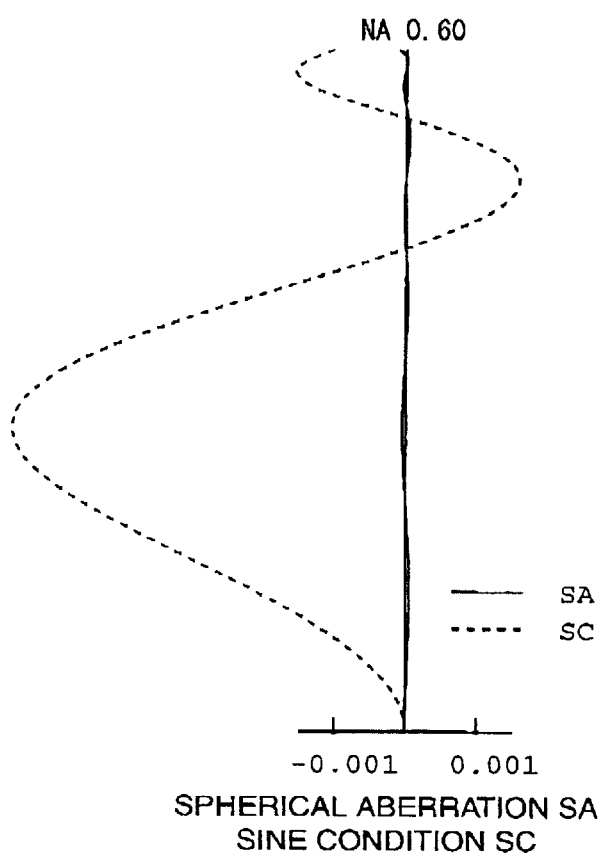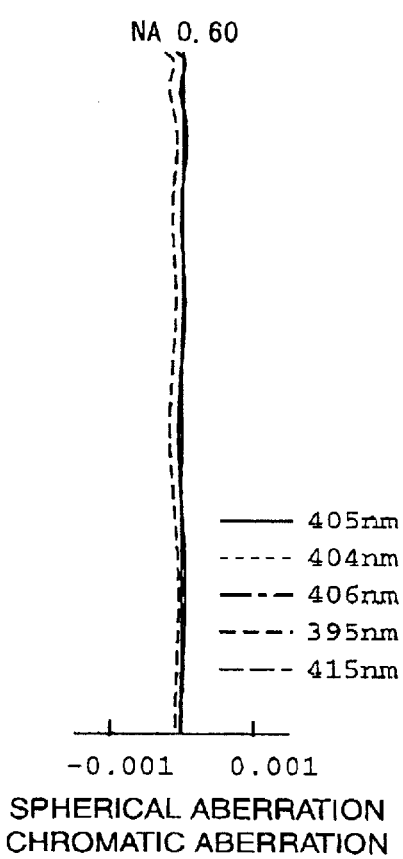

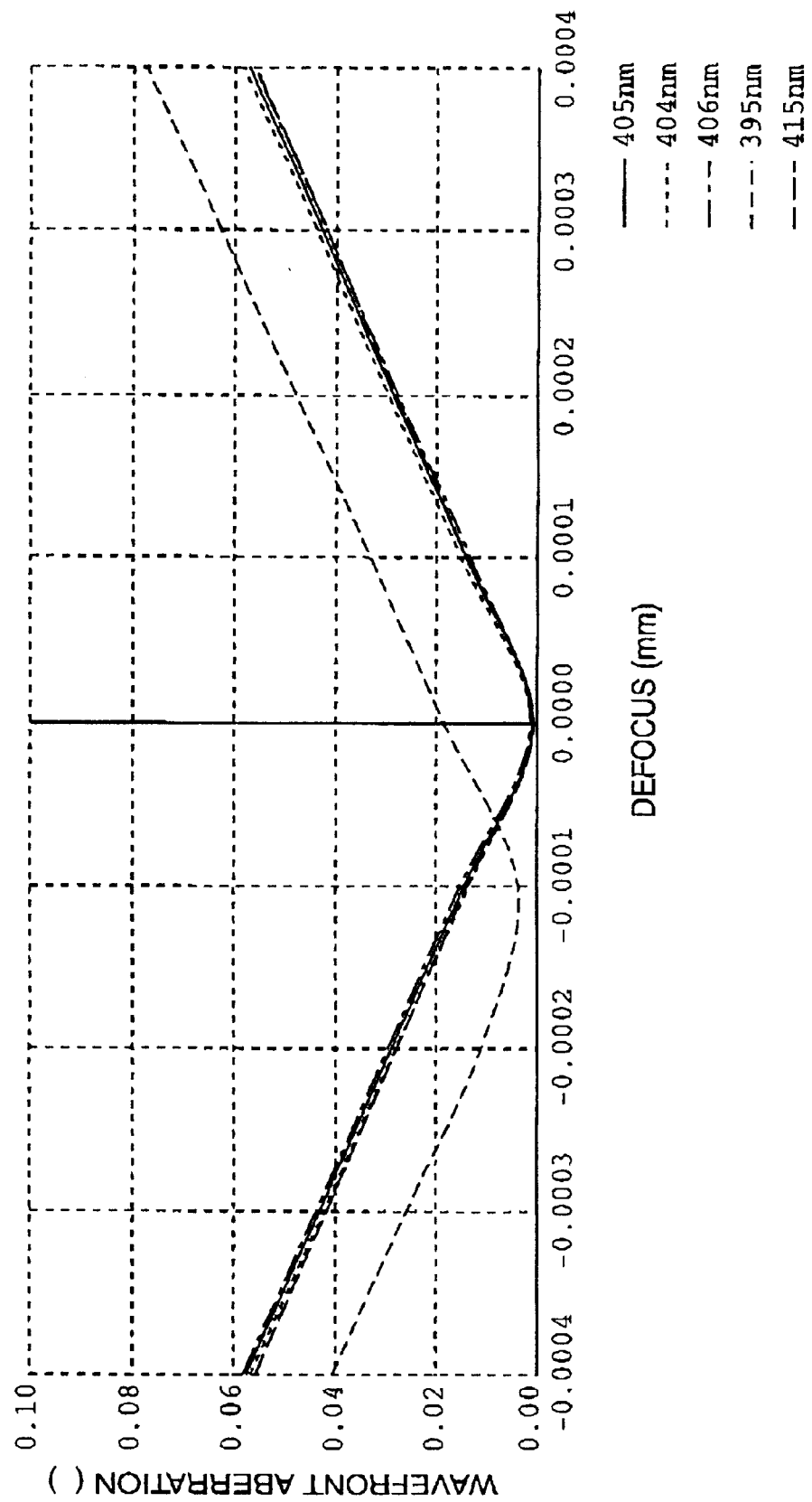

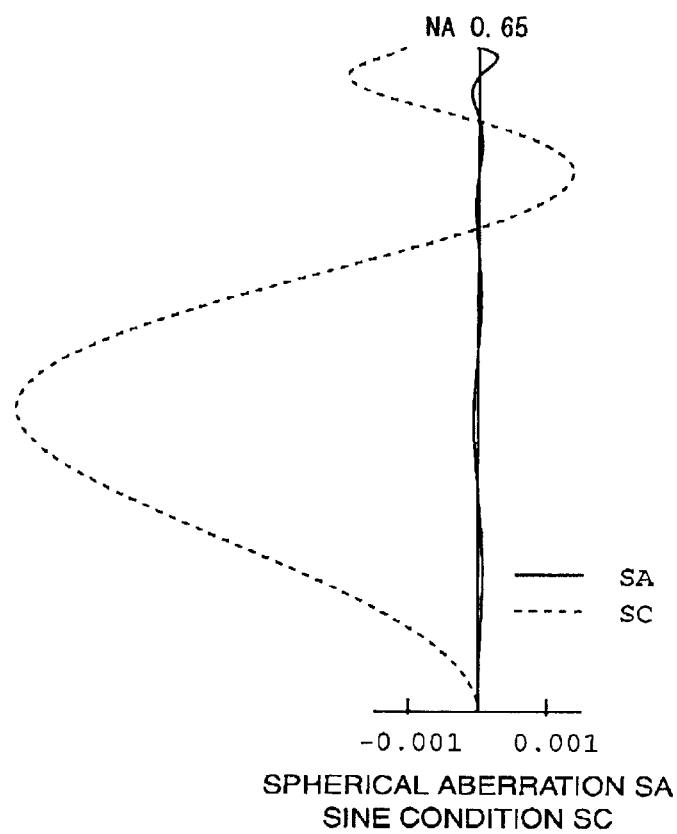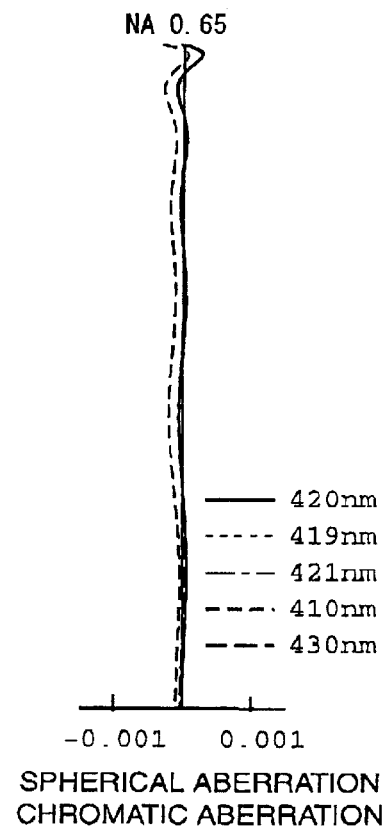

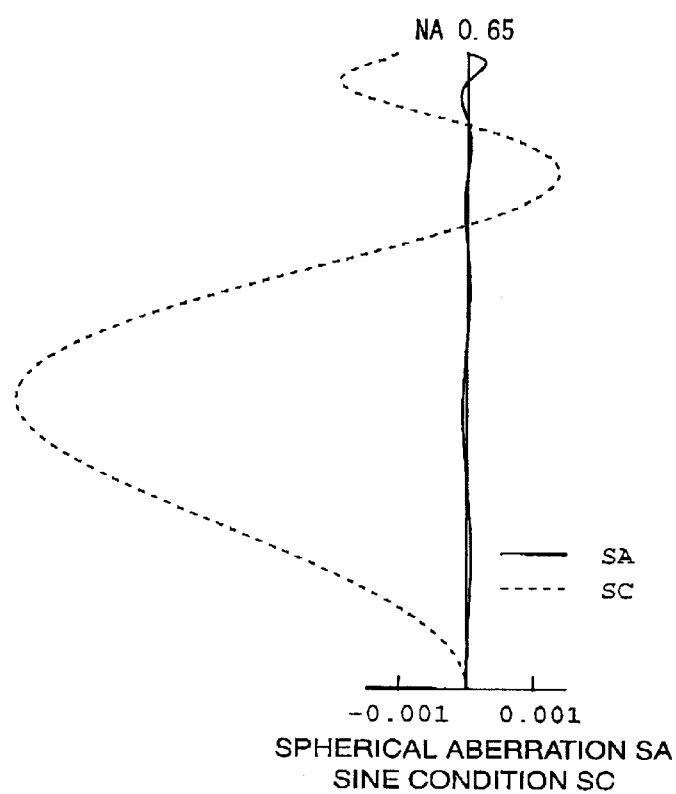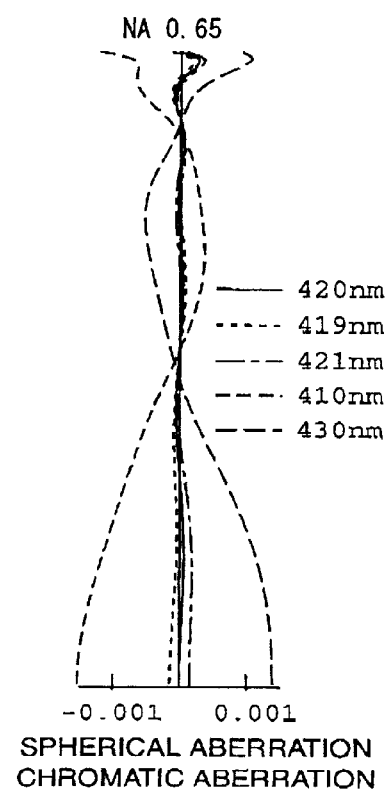

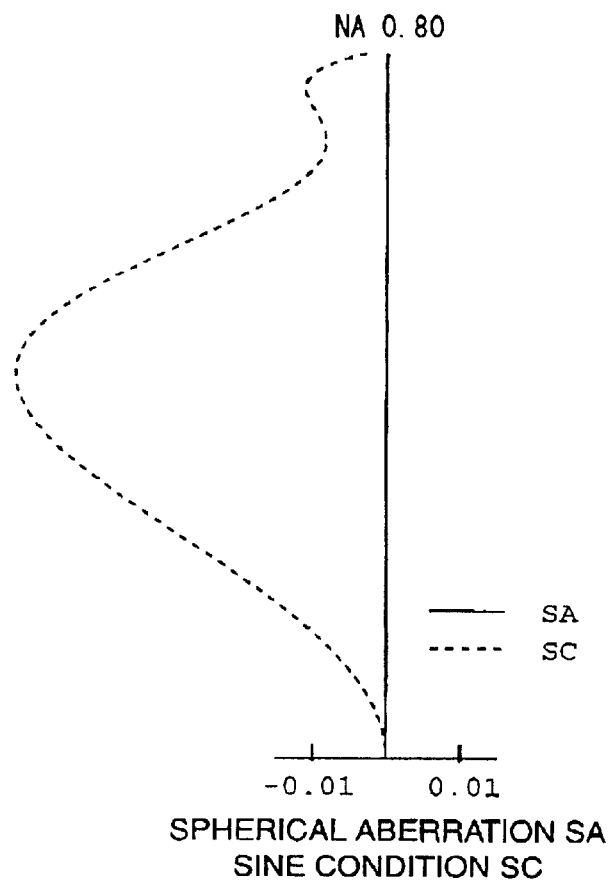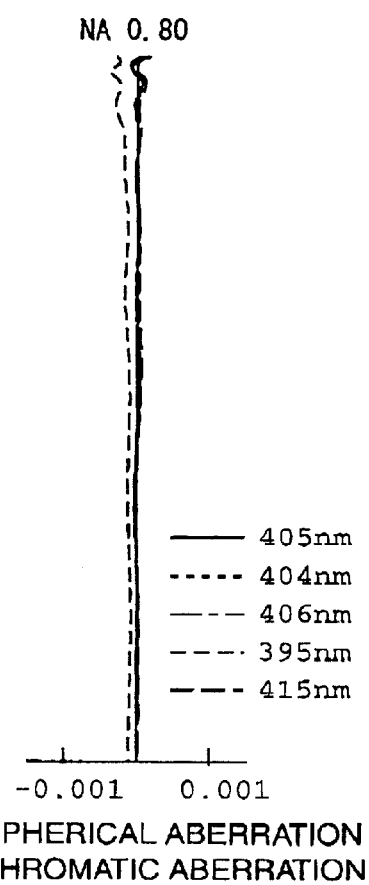

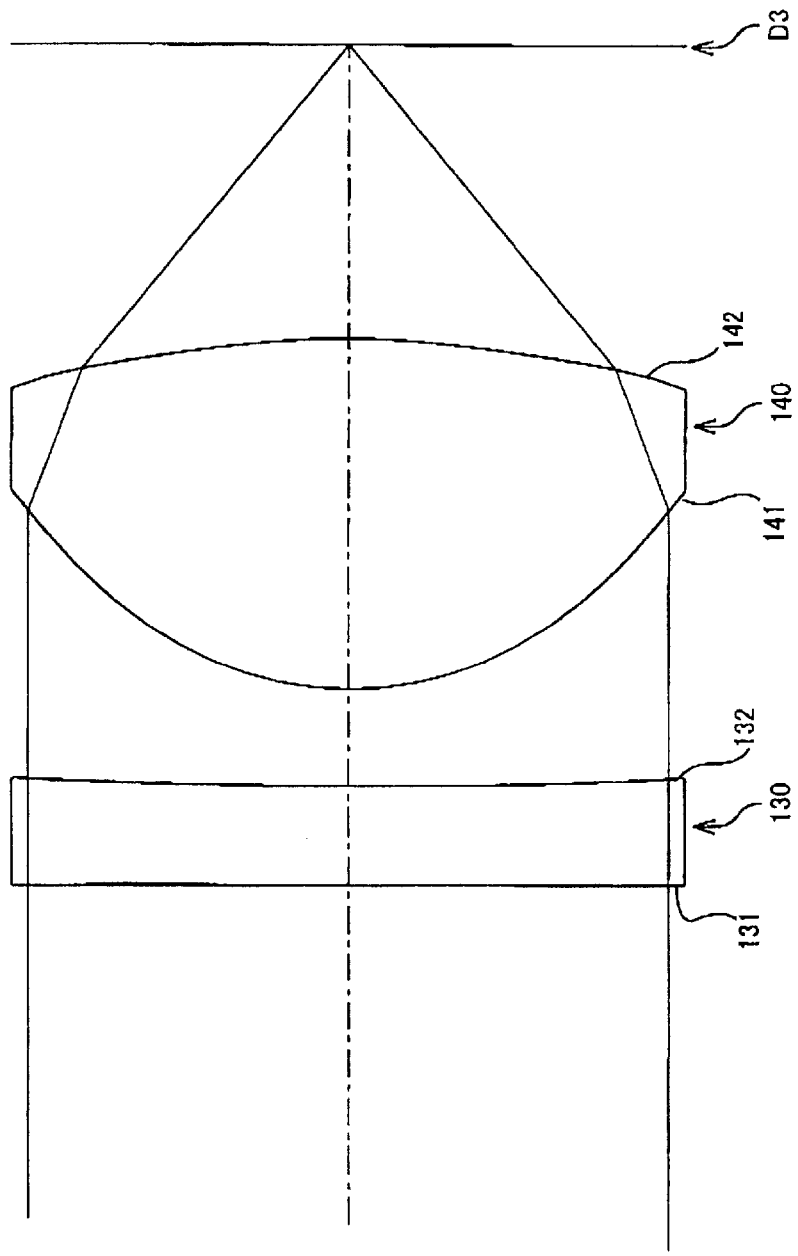

NA 0.60

SPHERICAL ABERRATION SA
SINE CONDITION SC

NA 0.60

SPHERICAL ABERRATION
CHROMATIC ABERRATION

OBJECTIVE OPTICAL SYSTEM FOR OPTICAL PICK-UP

BACKGROUND OF THE INVENTION

The present invention relates to an objective optical system for an optical pick-up that writes information data onto an optical disc and/or reads information data from an optical disc.

There are several types of optical discs such as a CD (compact disc), a CD-R (CD recordable) or a DVD (digital versatile disc). The recording density of a DVD is larger than that of a CD or a CD-R. Further, an optical disc that has a still larger recording density has been developed. When the recording density becomes larger, a diameter of a beam spot formed on an optical disc is required to be smaller. Since the beam spot diameter is in inverse proportion to a numerical aperture (NA) and is in proportion to a wavelength of a light beam, it is necessary to increase the NA of an objective lens or to shorten the wavelength of the light beam in order to decrease the beam spot diameter.

The large NA requires the large effective diameter for the objective lens. However, when the objective lens is designed as a single lens element, the radius of curvature of at least one lens surface becomes significantly small, which results in too large of a center thickness to keep an appropriate edge thickness. Therefore, when a large NA objective optical system is employed to decrease the beam spot diameter, the size and weight of the objective optical system becomes too large to make the optical pick-up compact and light.

On the other hand, when a working wavelength becomes shorter, a wavelength dependence of the refractive index of the lens material increases. For instance, the wavelength dependence of the refractive index of lens material that is generally used to make the objective lens is $-3 \times 10^{-5}$ nm$^{-1}$ at the wavelength in the vicinity of 650 nm, while the wavelength dependence of the same material is $-15 \times 10^{-5}$ nm$^{-1}$ at the wavelength in the vicinity of 400 nm. A semiconductor laser, which is employed as a light source of an optical pick-up, has a tolerance of an emission wavelength due to an individual difference, and an emission wavelength varies due to temperature change or the like. Therefore, the objective optical system is required to reduce the variation of the aberration due to the change of the wavelength. Particularly, when the working wavelength is smaller than F-line, since a focal depth becomes smaller in addition to the increasing of the wavelength dependence, it is important to correct the chromatic aberration.

A conventional method for correcting chromatic aberration is to combine a plurality of glass lenses whose Abbe numbers are different from each other. Further, Japanese patent provisional publication No. Hei 11-337818 discloses an objective lens that is a combination of a refractive lens and a diffractive lens structure formed on one surface of the refractive lens for correcting chromatic aberration. This publication teaches that a focal length fD of the diffractive lens structure and a focal length f of the entire objective optical system should satisfy a condition 40<fD/f. Further, it is assumed that the objective lens is made of plastic through an injection molding method in order to increase accuracy and to reduce cost.

However, since a transmittance of optical glass, particularly of high dispersion optical glass is significantly low at the wavelength shorter than F-line, a loss of light amount becomes too large when a plurality of lenses are used for correcting chromatic aberration. On the other hand, when the condition disclosed in the Japanese patent provisional publication No. Hei 11-337818 is applied to an objective optical system used at the wavelength shorter than F-line, the chromatic aberration cannot be adequately corrected even if any lens material is employed.

SUMMARY OF THE INVENTION

It is therefore an object of the present invention to provide an objective optical system that is capable of correcting chromatic aberration at a wavelength shorter than F-line.

For the above object, according to the first aspect of the present invention, there is provided an improved objective optical system that includes a refractive lens on which the diffractive lens structure is formed and satisfies the following condition (1);

$$1/(v^3 \times \lambda \times 10^{-6}) < 0.0045 \qquad (1)$$

where $v$ is an Abbe number and $\lambda$ is a working wavelength (unit: nm).

At least one surface of the refractive lens is formed as an aspherical surface whose radius of curvature increases as a height from the optical axis becomes large. The diffractive lens structure has a plurality of concentric ring-shaped steps to correct chromatic aberration caused by the refractive lens.

In general, dispersion of lens material is represented by the Abbe number $v$ that is calculated from refractive indexes at C-line (656 nm), F-line (486 nm) and d-line (588 nm). Since the Abbe number increases as the dispersion becomes smaller, the lens material whose Abbe number is large is advantageous to prevent occurrence of chromatic aberration.

The dispersion, which is variation of the refractive index due to wavelength change, tends to become large as the wavelength becomes shorter. A difference between the dispersions of two lens materials is nearly equal to the cube of the difference between the Abbe numbers thereof at the wavelength shorter than F-line. Therefore, the cube of the Abbe number should be used as an index of the chromatic aberration at the wavelength shorter than F-line instead of the Abbe number.

On the other hand, the maximum permissible level of the chromatic aberration at a predetermined wavelength is proportional to the wavelength. Because the focal depth DOE, which is considered as an index of the maximum permissible level of the chromatic aberration, is also proportional to the wavelength as represented by DOF=$k\lambda$/NA$^2$ (k is a constant of proportionality).

Therefore, since the maximum permissible level of the chromatic aberration is represented by the reciprocal of the cube of the Abbe number $1/v^3$, $1/v^3\lambda$<K (K is a constant of proportionality) should be held to control the chromatic aberration in the wavelength shorter than F-line.

Thus, the product of the reciprocal of the wavelength $\lambda$ and the reciprocal of $v^3$ should be smaller than a predetermined value in order to reduce the chromatic aberration caused by the refractive lens at the wavelength shorter than F-line. The condition (1) defines the upper limit of the product.

With the above construction, the wavelength dependence of the refractive index at the working wavelength can be kept small, which reduces the chromatic aberration caused by the refractive lens. As a result, the diffractive lens structure adequately corrects the chromatic aberration.

The refractive lens on which the diffractive lens structure is formed is preferably made of glass. Since deformation and variation of refractive index of glass due to temperature change is smaller than that of plastic, the diffractive lens structure can be designed without consideration of the deformation and the variation of the refractive index, which allows the diffractive lens structure to be designed to adequately correct the chromatic aberration.

Further, it is preferable to satisfy the following conditions (2) and (3) when the objective optical system is applied to an optical disc whose information layer is covered by a transparent cover layer. The following conditions (3) and (4) are preferably satisfied when the objective optical system is applied to an optical disc whose information layer is not covered by a cover layer.

$$-0.015 < [\Delta nL \cdot fD \cdot f / \{(nL-1) \cdot (fD-f)\} - \Delta nd \cdot td/nd^2] \cdot fD(f \cdot NA/uh\_d)^2/f < -0.007 \quad (2)$$

$$-0.3 < \phi_4/\phi_2 < 0.3 \quad (3)$$

$$-0.015 < [\Delta nL \cdot fD \cdot f / \{(nL-1) \cdot (fD-f)\}] \cdot fD(f \cdot NA/uh\_d)^2/f < -0.007 \quad (4)$$

where $\Delta nL$ is the rate of change of the refractive index of the refractive lens represented by the following equation, $$\Delta nL = (nL_{+1} - nL_{-1})/2$$

$nL_{+1}$ is the refractive index of the refractive lens at the wavelength $(\lambda+1)$ nm;

$nL_{-1}$ is the refractive index of the refractive lens at the wavelength $(\lambda-1)$ nm;

nL is the refractive index of the refractive lens at the working wavelength $\lambda$ nm;

fD Is the focal length of the diffractive lens structure represented by the following equation.

$$fD = -\{1/(2P_2 \times m \times \lambda)\};$$

$P_i$ is a coefficient of i-th order when the additional optical path length $\phi(h)$ added by the diffractive lens structure is expressed by the following equation, $$\phi(h) = (P_0 + P_2 h^2 + P_4 h^4 + P_6 h^6 + \ldots) \times m \times \lambda;$$

h is a height from the optical axis;

m is a diffraction order;

f is the focal length of the objective optical system;

$\Delta nd$ is the rate of change of the refractive index of the cover layer represented by the following equation, $$\Delta nd = (nd_{+1} - nd_{-1})/2$$

$nd_{+1}$ is the refractive index of the cover layer at the wavelength $(\lambda+1)$ nm;

$nd_{-1}$ is the refractive index of the cover layer at the wavelength $(\lambda-1)$ nm;

nd is the refractive index of the cover layer at the working wavelength $\lambda$ nm;

td is a thickness of the cover layer;

NA is a numerical aperture of the objective optical system;

uh_d is an effective radius of the area within which the diffractive lens structure is formed; and $\phi_2$ and $\phi4$ are optical path differences represented by the following equations, respectively, $$\phi_2 = P_2 \cdot uh\_d^2 \times m \times \lambda,$$

$$\phi_4 = P_4 \cdot uh\_d^4 \times m \times \lambda.$$

According to the second aspect of the present invention, there is provided an improved objective optical system that includes a single glass refractive lens and a chromatic aberration correcting element made of plastic on which a diffractive lens structure is formed and the refractive lens satisfies the above-mentioned condition (1).

At least one surface of the refractive lens is formed as an aspherical surface whose radius of curvature increases as a height from the optical axis becomes large. The diffractive lens structure has a plurality of concentric ring-shaped steps to correct chromatic aberration caused by the refractive lens.

With the above construction, the chromatic aberration caused by the refractive lens can be kept small because the refractive lens satisfies the condition (1). As a result, the diffractive lens structure formed on the chromatic aberration correcting element adequately corrects the chromatic aberration.

It is preferable that the chromatic aberration correcting element has no power at the working wavelength $\lambda$ and the following condition (5) is satisfied;

$$|\Delta nC/\Delta nL| > 2 \quad (5)$$

where $\Delta nC$ is the rate of change of the refractive index of the chromatic aberration correcting element represented by the following equation, $$\Delta nC = (nC_{+1} - nC_{-1})/2$$

$nC_{+1}$ is the refractive index of the chromatic aberration correcting element at the wavelength $(\lambda+1)$ nm; and $nC_{-1}$ is the refractive index of the chromatic aberration correcting element at the wavelength $(\lambda-1)$ nm.

Further, when the following condition (6) is satisfied, the number of the ring-shaped steps can be reduced, which eases the manufacturing of the chromatic aberration correcting element and increases the diffraction efficiency.

$$|\Delta nC/\Delta nL| > 4 \quad (6)$$

Since the diffractive lens structure is not formed on the refractive lens, it is unnecessary to take moldability and transforming ability into account when the refractive lens is designed, which allows the refractive lens to be made of lens material whose wavelength dependence of the refractive index is small. The transforming ability is an index to measure a transformation of a pattern formed on a molding die to a molded replica.

On the other hand, it is known that a value corresponding to Abbe number for a diffractive lens structure is equal to −3.453. The negative sign of the value reflects the opposite sense of the dispersion when compared with that of optical glass or optical plastic, and its low magnitude is an indication of the large dispersion. That is, the chromatic aberration caused by the positive refractive lens can be corrected by means of the diffractive lens structure having small positive power. When the chromatic aberration correcting element has no power as described above, the positive diffractive power of the diffractive lens structure and the negative refractive power of the chromatic aberration correcting element as a refractive element are counterbalanced at the working wavelength $\lambda$. That is, the negative refractive function of the chromatic aberration correcting element also corrects the chromatic aberration caused by the positive refractive lens. As a result, when the chromatic aberration correcting element is made of material whose wavelength dependence of the refractive index is large, the chromatic aberration correcting function required for the diffractive lens structure is reduced, which reduces the number of the ring-shaped steps, increasing the moldability and the transforming ability.

Further, it is preferable that the refractive lens is located between the chromatic aberration correcting element and the optical disc to keep a sufficient back focus (a working distance). The refractive lens is preferably arranged such that the surface having larger power faces the chromatic aberration correcting element.

It is preferable to satisfy the following condition (7) when the objective optical system is applied to an optical disc whose information layer is covered by a transparent cover layer. The following condition (8) is preferably satisfied when the objective optical system is applied to an optical disc whose information layer is not covered by a cover layer.

$$0.0001 < [\{-2 \cdot P_2 \cdot m \cdot (1.0 \times 10^{-6})f + 1\}^{-1} - \{\Delta nL/(nL-1)\} - 1] \cdot f + \Delta nd \cdot td/nd^2 < 0.0003 \quad (7)$$

$$0.0001 < [\{-2 \cdot P_2 \cdot m \cdot (1.0 \times 10^{-6})f + 1\}^{-1} - \{\Delta nL/(nL-1)\} - 1] \cdot f < 0.0003 \quad (8)$$

DESCRIPTION OF THE ACCOMPANYING DRAWINGS

FIG. 4 is a graph showing a relationship between an rms (root-mean-square) value of the wavefront aberration and defocus in the objective optical system of the first embodiment:

FIGS. 5A and 5B are graphs showing spherical aberration with sine condition and chromatic aberration, respectively, of the objective optical system according to a second embodiment;

FIGS. 7A and 7H are graphs showing spherical aberration with sine condition and chromatic aberration, respectively, of the objective optical system according to a third embodiment;

FIGS. 12A and 12B are graphs showing spherical aberration with sine condition and chromatic aberration, respectively, of the objective optical system according to a fifth embodiment;

FIGS. 15A and 15B are graphs showing spherical aberration with sine condition and chromatic aberration, respectively, of the objective optical system according to the sixth embodiment;

FIGS. 18A and 18B are graphs showing spherical aberration with sine condition and chromatic aberration, respectively, of the objective optical system according to the seventh embodiment;

FIGS. 21A and 21B are graphs showing spherical aberration with sine condition and chromatic aberration, respectively, of the objective optical system according to the eighth embodiment;

FIGS. 24A and 24B are graphs showing spherical aberration with sine condition and chromatic aberration, respectively, of the objective optical system according to the ninth embodiment;

FIG. 25 is a graph showing a relationship between the rms value of the wavefront aberration and defocus in the objective optical system of the ninth embodiment;

FIGS. 27A and 27B are graphs showing spherical aberration with sine condition and chromatic aberration, respectively, of the objective optical system according to the tenth embodiment:

FIGS. 29A and 29B are graphs showing spherical aberration with sine condition and chromatic aberration, respectively, of the objective optical system according to an eleventh embodiment;

FIGS. 31A and 31B are graphs showing spherical aberration with sine condition and chromatic aberration, respectively, of the objective optical system according to a twelfth embodiment;

FIG. 33 is a lens diagram of the objective optical system according to a thirteenth embodiment;

DESCRIPTION OF THE EMBODIMENTS

Thirteen embodiments of an objective optical system embodying the present invention will be described with reference to the drawings. Each objective optical system of the first through sixth embodiments consists of a single lens element. Further, each objective optical system of the seventh through thirteenth embodiments consists of a refractive lens and a correcting element.

Figure 1A:
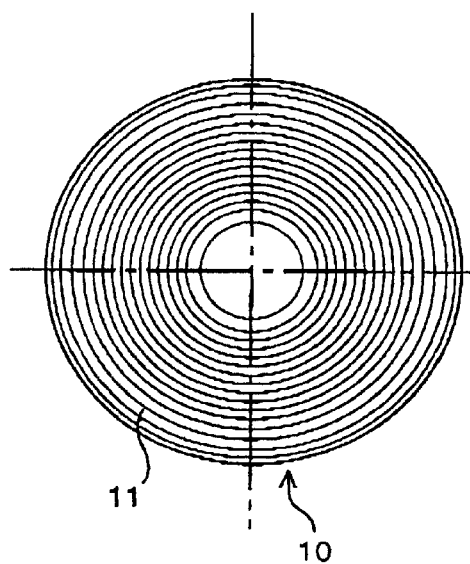
FIG. 1A is a front view of an objective lens of an objective optical system embodying the invention.
Figures 1B, 1C:
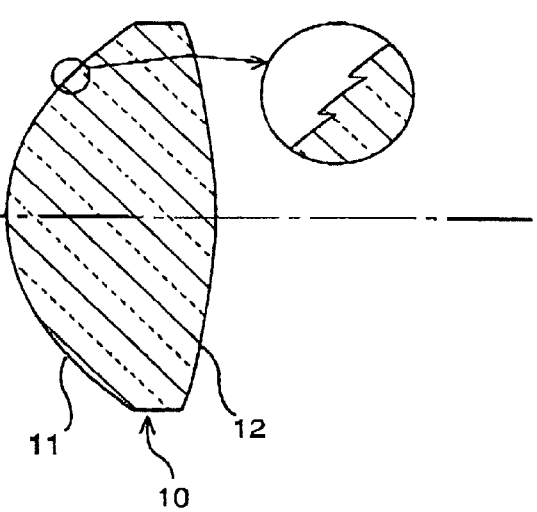
FIG. 1B is a vertical cross-sectional view of the objective lens of FIG. 1A.
FIG. 1C is an enlarged view of FIG. 1B.

FIGS. 1A, 1B and 1C show basic construction of the objective optical system according to the first through sixth embodiments: FIG. 1A is a front view; FIG. 1B is a vertical cross-sectional view; and FIG. 1C is an enlarged view of FIG. 1B. The objective optical system consists of an objective lens 10.

The objective lens 10 is a biconvex lens having first and second surfaces 11 and 12. A diffractive lens structure is formed on the first surface 11 of the objective lens 10 as a large number of concentric ring-shaped steps each of which has a wedge sectional shape as shown in FIG. 1C. The second surface 12 is formed as a continuous surface without steps. The base curve, which is the shape of the surface of the refractive lens when the diffractive lens structure is not formed, of the first surface 11 and the second surface 12 are rotationally-symmetrical aspherical surfaces whose radii of curvature increase as heights from the optical axis become large. The diffractive lens structure has a function to correct chromatic aberration caused by the refractive lens portion. The diffractive lens structure may be formed on the second surface 12 instead of the first surface 11.

An additional optical path length added by a diffractive lens structure formed on the first surface 11 of the objective lens 10 is expressed by the following optical path difference function $\Phi(h)$:

$$\Phi(h)=(P_2 h^2 + P_4 h^4 + P_6 h^6 + \ldots) \times m \times \lambda$$

where $P_2$, $P_4$ and $P_6$ are coefficients of second, fourth and sixth orders, h is a height from the optical axis, m is a diffraction order and $\lambda$ is a wavelength of an incident light beam. When the optical path length at the predetermined height is larger than the optical path length on the optical axis, the additional optical path length at the predetermined height has a positive value.

An actual microscopic shape of the diffractive lens structure is defined by subtracting $\lambda \times i$ (i: integer) from $\Phi(h)$ to have the stepwise additional optical path length. The width of the ring-shaped step is determined such that the difference between the optical path difference function $\Phi(h)$ at the inner edge of the ring-shaped step and that at the outer edge of the same step equals one wavelength. Further, the distance in the optical axis direction between the adjacent ring-shaped steps at the boundary thereof is determined such that the optical path difference between the light ray passing through the one ring-shaped step and the light ray passing through the other ring-shaped step becomes equal to one wavelength.

The objective lens 10 of the objective optical system according to the first through sixth embodiments is made of lens material satisfying the following condition (1).

$$1/(v^3 \times \lambda \times 10^{-6}) < 0.0045 \tag{1}$$

where $v$ is an Abbe number and $\lambda$ is a working wavelength (unit: nm).

When the condition (1) is satisfied, the wavelength dependence of the refractive index of the refractive lens at the working wavelength can be kept small, which reduces the chromatic aberration caused by the refractive lens. As a result, the diffractive lens structure adequately corrects the chromatic aberration. If the upper limit of the condition (1) is exceeded, the chromatic aberration caused by the refractive lens becomes too large. When the chromatic aberration to be corrected by the diffractive lens structure becomes larger, the number of ring-shaped steps increases and the width of each ring-shaped step decreases, which results in difficult manufacturing and a reduction of diffraction efficiency.

The objective lens 10 is made of glass. Since deformation and variation of refractive index of glass due to temperature change is smaller than that of plastic and these become negligible when the diffractive lens structure is designed, a designer can concentrate on the correction of the chromatic aberration to adequately correct the chromatic aberration.

Further, the objective lens 10 satisfies the conditions (2) and (3) when the objective optical system is applied to an optical disc whose information layer is covered by a transparent cover layer and satisfies the conditions (3) and (4) when the objective optical system is applied to an optical disc whose information layer is not covered by a cover layer.

$$-0.015 < [\Delta nL \cdot fD \cdot f / \{(nL-1) \cdot (fD-f)\} - \Delta nd \cdot td/nd^2] fD(f \cdot NA/uh\_d)^2/f < -0.007 \tag{2}$$

$$-0.3 < \phi_4/\phi_2 < 0.3 \tag{3}$$

$$-0.015 < [\Delta nL \cdot fD \cdot f / \{(nL-1) \cdot (fD-f)\}] fD(f \cdot NA/uh\_d)^2/f < -0.007 \tag{4}$$

Where $\Delta nL$ is the rate of change of the refractive index of the refractive lens represented by the following equation, $$\Delta nL = (nL_{+1} - nL_{-1})/2$$

$nL_{+1}$ is the refractive index of the refractive lens at the wavelength $(\lambda+1)$ nm;

$nL_{-1}$ is the refractive index of the refractive lens at the wavelength $(\lambda-1)$ nm;

$nL$ is the refractive index of the refractive lens at the working wavelength $\lambda$ nm;

fD is the focal length of the diffractive lens structure represented by the following equation, $$fD = -\{1/(2P_2 \times m \times \lambda)\};$$

f is the focal length of the objective optical system;

$\Delta nd$ is the rate of change of the refractive index of the cover layer represented by the following equation, $$\Delta nd = (nd_{+1} - nd_{-1})/2$$

$nd_{+1}$ is the refractive index of the cover layer at the wavelength $(\lambda+1)$ nm;

$nd_{-1}$ is the refractive index of the cover layer at the wavelength $(\lambda-1)$ nm;

nd is the refractive index of the cover layer at the working wavelength λ nm;

td is a thickness of the cover layer;

NA is a numerical aperture of the objective optical system;

uh_d is an effective radius of the area within which the diffractive lens structure is formed; and $\phi_2$ and $\phi_4$ are optical path differences represented by the following equations, respectively, $\phi_2 = P_2 \cdot uh\_d^2 \times m \times \lambda,$ $\phi_4 = P_4 \cdot uh\_d^4 \times m \times \lambda.$ The condition (2) defines the magnitude of a diffractive power of the surface on which the diffractive lens structure is formed to keep the balance between the chromatic aberration caused by the refractive lens portion of the objective lens 10 and the chromatic aberration caused by the cover layer of the optical disc. When the condition (2) is satisfied, the chromatic aberration can be reduced under actual use. If the intermediate term is lower than the lower limit of the condition (2), the correcting effect of the diffractive lens structure becomes short. If the intermediate term is larger than the upper limit of the condition (2), the correcting effect of the diffractive lens structure becomes excessive.

The condition (3) defines the ratio of the second order component and the fourth order component of the diffractive function of the diffractive lens structure. When the ratio satisfies the condition (3), the variation of the spherical aberration due to the variation of the wavelength can be corrected. If the ratio does not satisfy the condition (3), the variation of the spherical aberration cannot be adequately corrected.

The condition (4) defines the magnitude of the diffractive power of the surface on which the diffractive lens structure is formed when the optical disc does not have a cover layer. When the condition (4) is satisfied, the chromatic aberration can be reduced under actual use. If the intermediate term is lower than the lower limit of the condition (4), the correcting effect of the diffractive lens structure becomes short. If the intermediate term is larger than the upper limit of the condition (4), the correcting effect of the diffractive lens structure becomes excessive.

Further, the diffractive lens structure formed on the objective lens 10 is designed to use the first order diffraction light. However, any order diffraction lights can be used, for example, the second order diffraction light can be used. The larger the diffraction order of the light is, the wider the ring-shaped step of the diffractive lens structure. Therefore, if the width of each ring-shaped step becomes too narrow to precisely manufacture the diffractive lens structure under the design to use the first order diffraction light, the diffractive lens structure can be re-designed to use the second or higher order diffraction light. This enlarges the width of each ring-shaped step, which eases the manufacturing and prevents the reduction of the diffraction efficiency.

First Embodiment

Figure 2:
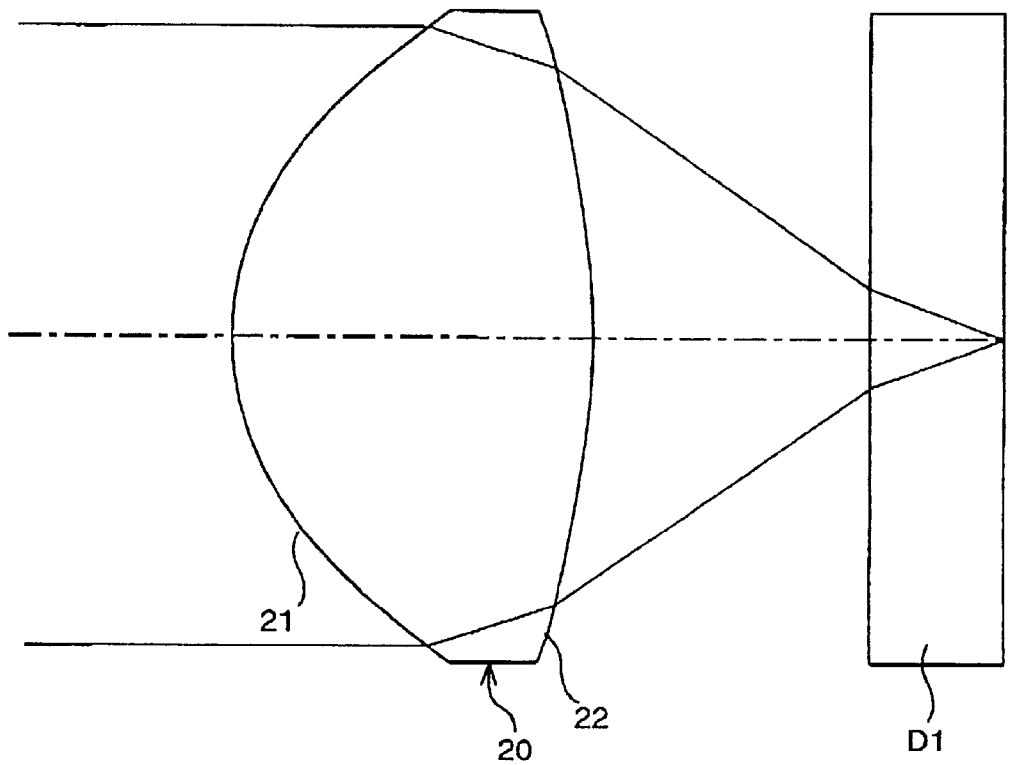
FIG. 2 is a lens diagram of the objective optical system according to a first embodiment.

FIG. 2 shows an objective optical system of the first embodiment and an optical disc D1 having a cover layer of 0.6 mm in thickness. The objective optical system of the first embodiment consists of an objective lens 20. The diffractive lens structure is formed on a first surface 21 of the objective lens 20. The base curve of the first surface 21 and a second surface 22 of the lens 20 are rotationally-symmetrical aspherical surfaces.

A rotationally-symmetrical aspherical surface is expressed by the following equation:

$$X(h) = \frac{h^2 c}{1 + \sqrt{1-(1+\kappa)h^2 c^2}} + A_4 h^4 + A_6 h^6 + A_8 h^8 + A_{10} h^{10} + A_{12} h^{12} \dots$$

X(h) is a sag, that is, a distance of a curve from a tangential plane at a point on the surface where the height from the optical axis is h. Symbol c is a curvature (1/r) of the vertex of the surface, K is a conic constant, $A_4$, $A_6$, $A_8$, $A_{10}$ and $A_{12}$ are aspherical surface coefficients of fourth, sixth, eighth, tenth and twelfth orders, respectively.

The numerical constructions of the first embodiment are described in TABLE 1. In TABLE 1, λ, f and NA denote the working wavelength, the focal length and the numerical aperture of the objective lens 20 including the diffractive lens structure, respectively. Further, $nL_{405}$, ΔnL, tL and ν denote the refractive index at wavelength of 405 nm, therate of change of the refractive index, the center thickness and the Abbe number of the objective lens 20, $nd_{405}$, Δnd and td denote the refractive index at wavelength of 405 nm, the rate of change of the refractive index and the thickness of the cover layer of the optical disc. The reference uh_d denotes an effective radius of the area within which the diffractive lens structure is formed, m denotes a diffraction order, and r denotes the radius of curvature.

TABLE 1

| λ: 450 nm | f: 2.5 mm | NA: 0.60 |
|---|---|---|
| $nL_{405}$: 1.44185 | ΔnL: −7.5 × $10^{-5}$/nm | tL: 1.60 mm ν: 95.0 |
| $nd_{405}$: 1.62231 | Δnd: −4.1 × $10^{-4}$/nm | td: 0.60 mm |
| uh_d: 1.50 mm | m: 1 | |

| | First surface | Second surface |
|---|---|---|
| r | 1.459 | −3.464 |
| κ | −0.4800 | 0.0000 |
| A4 | −7.75717 × $10^{-3}$ | 3.46180 × $10^{-2}$ |
| A6 | 9.00752 × $10^{-4}$ | 2.37236 × $10^{-2}$ |
| A8 | −5.23422 × $10^{-4}$ | −3.06734 × $10^{-2}$ |
| A10 | 8.49317 × $10^{-4}$ | 1.17906 × $10^{-2}$ |
| A12 | −4.86639 × $10^{-4}$ | −1.67845 × $10^{-3}$ |
| P2 | −1.8000 × 10 | — |
| P4 | −1.7000 | — |
| P6 | −2.000 × $10^{-1}$ | — |

Figure 3A:
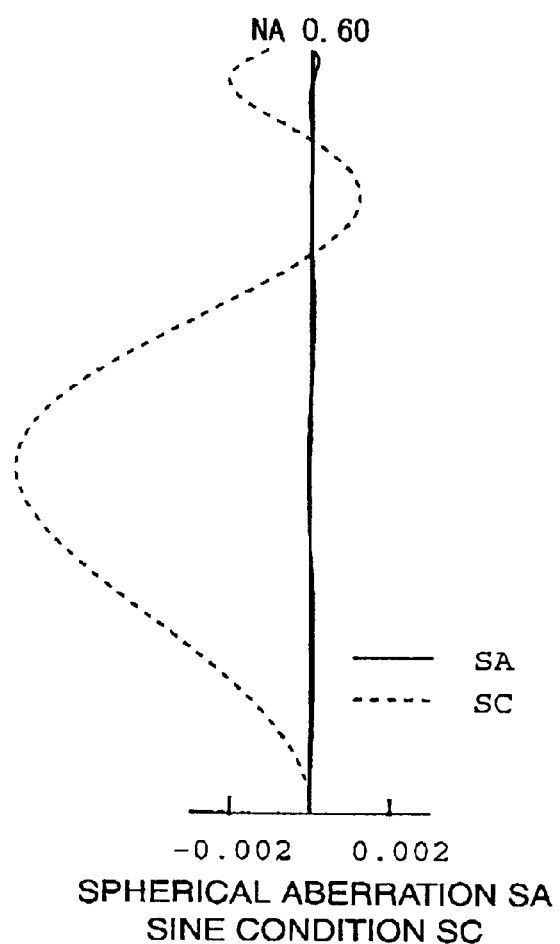
FIG. 3A is a graph showing spherical aberration with sine condition of the objective optical system according to the first embodiment.
Figure 3B:
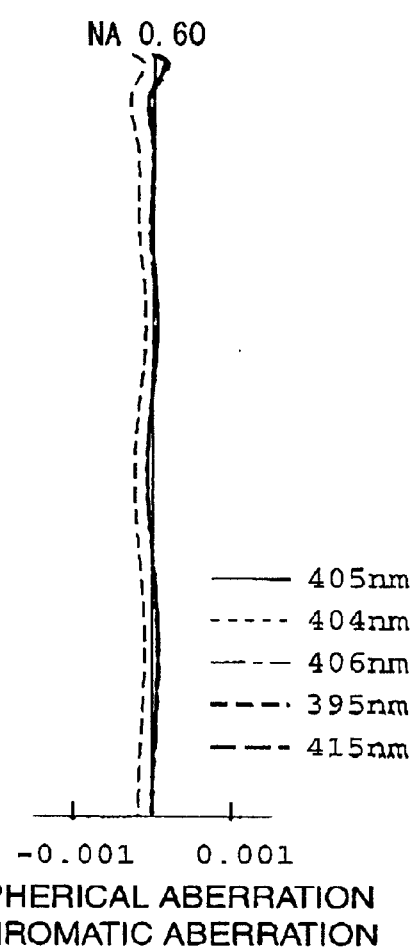
FIG. 3B is a graph showing chromatic aberration represented by spherical aberration at various wavelengths of the objective optical system according to the first embodiment.

FIG. 3A is a graph showing spherical aberration SA with sine condition SC at wavelength 405 nm when the objective lens 20 of the first embodiment is applied to the optical disc D1. FIG. 3B is a graph showing chromatic aberration represented by spherical aberration at wavelengths of 405 nm, 404 nm, 406 nm, 395 nm and 415 nm. The vertical axis of each graph denotes the numerical aperture NA, and the horizontal axis denotes the amount of the aberration (unit: mm).

Further, FIG. 4 is a graph showing a relationship between an rms (root-mean-square) value of the wavefront aberration and defocus at wavelengths of 405 nm, 404 nm, 406 nm, 395 nm and 415 nm according to the first embodiment. The horizontal axis denotes the amount of the defocus (unit: mm) and the vertical axis denotes the amount of the aberration (unit: wavelength).

FIG. 3B and FIG. 4 show that the curves of the spherical aberration and the minimum points of the wavefront aberration are in close agreement with one another at the wavelengths except 395 nm. Namely, these graphs make it clear that the lens 20 of the first embodiment is adequately corrected in the chromatic aberration within the wavelength range 404–415 nm.

The number of the ring-shaped steps of the diffractive lens structure according to the first embodiment equals 51 and the minimum width of the ring-shaped step equals 11.8 μm. On the other hand, when a comparative objective lens is made of plastic whose Abbe number equals 55.8 without changing the remaining conditions of the first embodiment, the number of the ring-shaped steps equals 97 and the minimum width of the ring-shaped step equals 6.4 μm in order to obtain the same correcting effect of the chromatic aberration. Since the number of the ring-shaped steps increases and the minimum width decreases, it becomes difficult to process the molding die and the transforming ability is reduced.

Further, when the pattern of the diffractive lens structure formed on the molding die is transformed to the lens material, "rounding" is necessarily caused at the corner of the boundary of the ring-shaped steps. Assuming that the amount of the rounding caused in the objective lens 20 made of glass is equal to the same in the comparative objective lens made of plastic, the diffraction efficiency of the diffractive lens structure of the objective lens 20 is 88.8%, while that of the comparative objective lens is 80.8%. When the amount of the rounding of the objective lens 20 is twice the above comparison in view of the difference of the transforming ability between plastic and glass (the transformation ability of plastic is larger than that of glass), the diffraction efficiency is 82.8% that is still larger than that of the comparative plastic objective lens.

Second Embodiment

The following TABLE 2 shows the numerical constructions of the objective optical system according to the second embodiment. The objective optical system of the second embodiment also consists of a single objective lens. The diffractive lens structure is formed on the first surface of the objective lens. Since the shape of the objective lens is similar to the first embodiment, a drawing of the lens is omitted.

TABLE 2

λ: 420 nm    f: 3.0 mm    NA: 0.50
$nL_{420}$: 1.50579    ΔnL: −8.5 × $10^{-5}$/nm    tL: 1.60 mm    ν: 81.6
$nd_{420}$: 1.61663    Δnd: −3.5 × $10^{-4}$/nm    td: 0.60 mm
uh_d: 1.50 mm    m: 1

| | First surface | Second surface |
|---|---|---|
| r | 1.888 | −7.032 |
| κ | −0.4800 | 0.0000 |
| A4 | −1.73000 × $10^{-3}$ | 1.52000 × $10^{-2}$ |
| A6 | −1.25000 × $10^{-4}$ | −5.37000 × $10^{-3}$ |
| A8 | −5.33000 × $10^{-4}$ | 3.00000 × $10^{-3}$ |
| A10 | 3.50000 × $10^{-4}$ | −1.82000 × $10^{-3}$ |
| A12 | −1.15000 × $10^{-4}$ | 3.33000 × $10^{-4}$ |
| P2 | −1.8000 × 10 | — |
| P4 | −1.2500 | — |
| P6 | 0.0000 | — |

Figure 6:
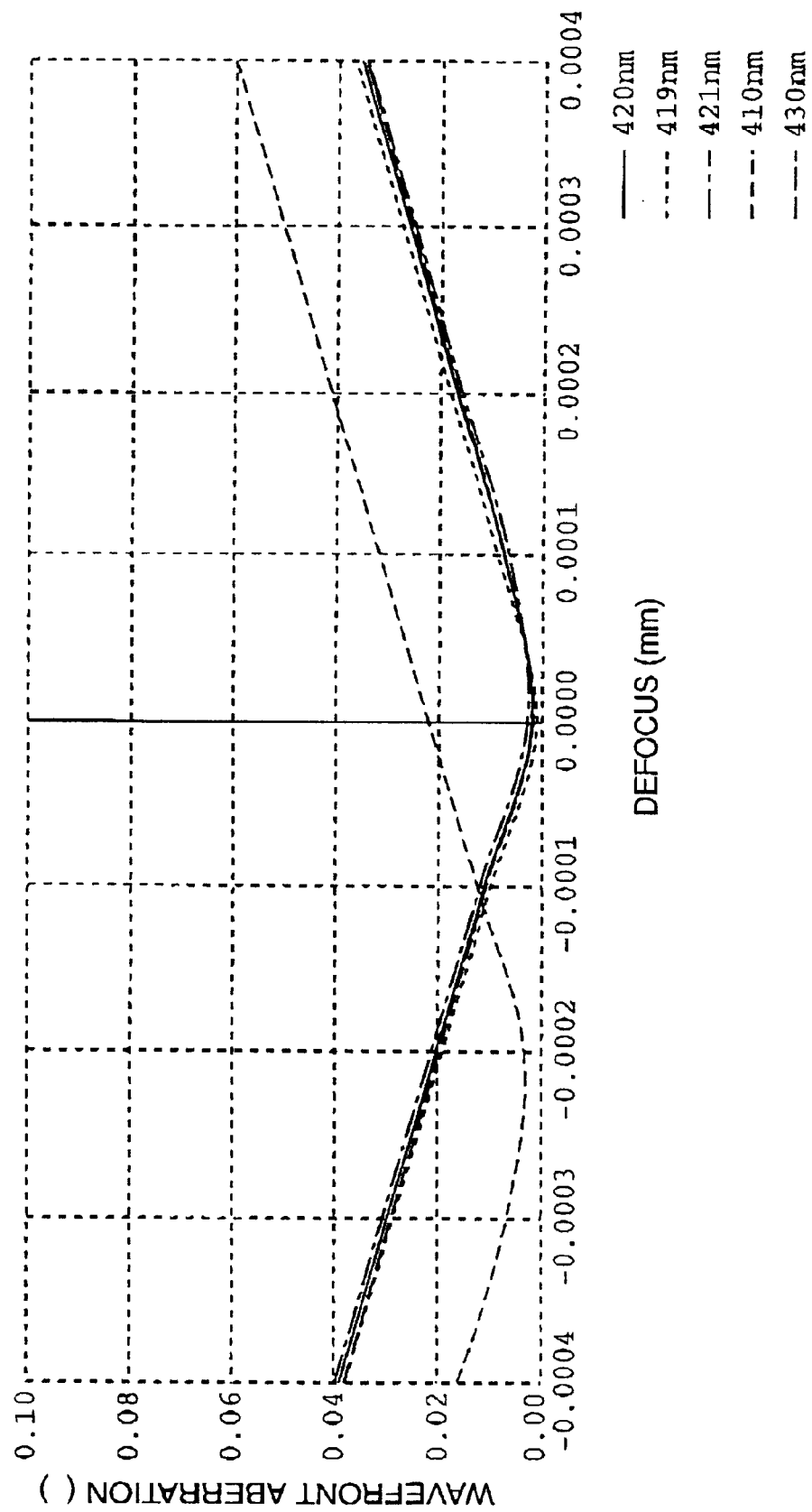
FIG. 6 is a graph showing a relationship between the rms value of the wavefront aberration and defocus in the objective optical system of the second embodiment.

FIG. 5A is a graph showing spherical aberration SA with sine condition SC at wavelength 420 nm when the objective lens of the second embodiment is applied to the optical disc D1, FIG. 5B is a graph showing chromatic aberration represented by spherical aberration at wavelengths of 420 nm, 419 nm, 421 nm, 410 nm and 430 nm. FIG. 6 is a graph showing a relationship between the rms value of the wavefront aberration and defocus at wavelengths of 420 nm, 419 nm, 421 nm, 410 nm and 430 nm according to the second embodiment.

FIG. 5B and FIG. 6 show that the curves of the spherical aberration and the minimum points of the wavefront aberration are in close agreement with one another at the wavelengths except 410 nm. Namely, these graphs make it clear that the lens of the second embodiment is adequately corrected in the chromatic aberration within the wavelength range 419–430 nm.

Third Embodiment

The following TABLE 3 shows the numerical constructions of the objective optical system according to the third embodiment. The objective optical system of the third embodiment also consists of a single objective lens. The diffractive lens structure is formed on the second surface of the objective lens. Since the shape of the objective lens is similar to the first embodiment, a drawing of the lens is omitted.

TABLE 3

λ: 405 nm    f: 3.0 mm    NA: 0.50
$nL_{405}$: 1.44185    ΔnL: −7.5 × $10^{-5}$/nm    tL: 1.60 mm    ν: 95.0
$nd_{405}$: 1.62231    Δnd: −4.1 × $10^{-4}$/nm    td: 0.60 mm
uh_d: 1.30 mm    m: 1

| | First surface | Second surface |
|---|---|---|
| r | 1.709 | −5.628 |
| κ | −0.4800 | 0.0000 |
| A4 | −3.56800 × $10^{-3}$ | 1.53000 × $10^{-2}$ |
| A6 | 5.20000 × $10^{-5}$ | −1.39000 × $10^{-3}$ |
| A8 | −7.00000 × $10^{-4}$ | −2.50000 × $10^{-4}$ |
| A10 | 4.35000 × $10^{-4}$ | −6.30000 × $10^{-4}$ |
| A12 | −1.61000 × $10^{-4}$ | 1.62000 × $10^{-4}$ |
| P2 | — | −3.2600 × 10 |
| P4 | — | 4.5800 |
| P6 | — | −5.0300 × $10^{-1}$ |

Figure 8:
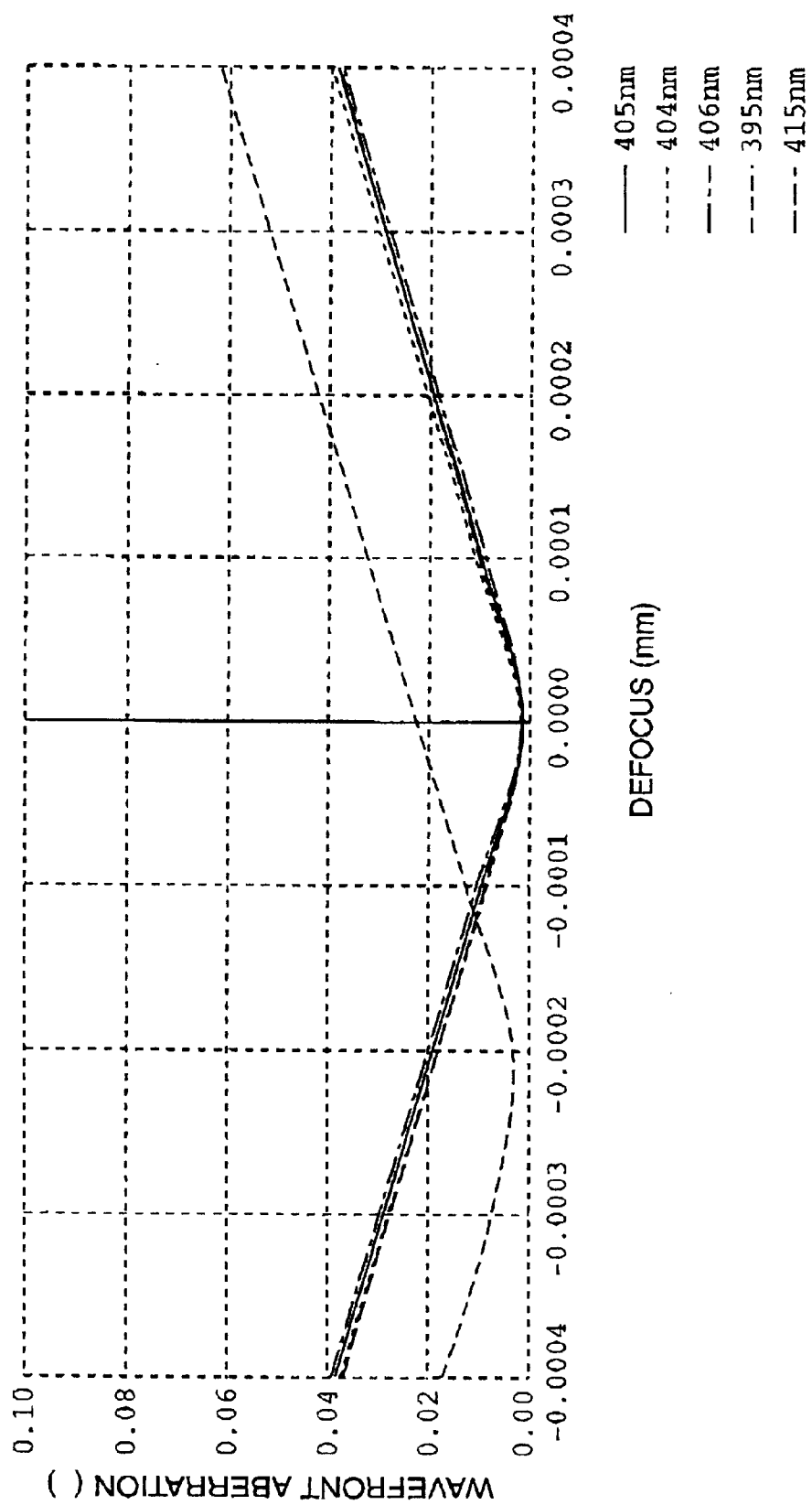
FIG. 8 is a graph showing a relationship between the rms value of the wavefront aberration and defocus in the objective optical system of the third embodiment.

FIG. 7A is a graph showing spherical aberration SA with sine condition SC at wavelength 405 nm when the objective lens of the third embodiment is applied to the optical disc D1, FIG. 7B is a graph showing chromatic aberration represented by spherical aberration at wavelengths of 405 nm, 404 nm, 406 nm, 395 nm and 415 nm. FIG. 8 is a graph showing a relationship between the rms value of the wavefront aberration and defocus at wavelengths of 405 nm, 404 nm, 406 nm, 395 nm and 415 nm according to the third embodiment.

FIG. 7B and FIG. 8 show that the curves of the spherical aberration and the minimum points of the wavefront aberration are in close agreement with one another at the wavelengths except 395 nm. Namely, these graphs make it clear that the lens of the third embodiment is adequately corrected in the chromatic aberration within the wavelength range 404–415 nm.

Fourth Embodiment

Figure 9:
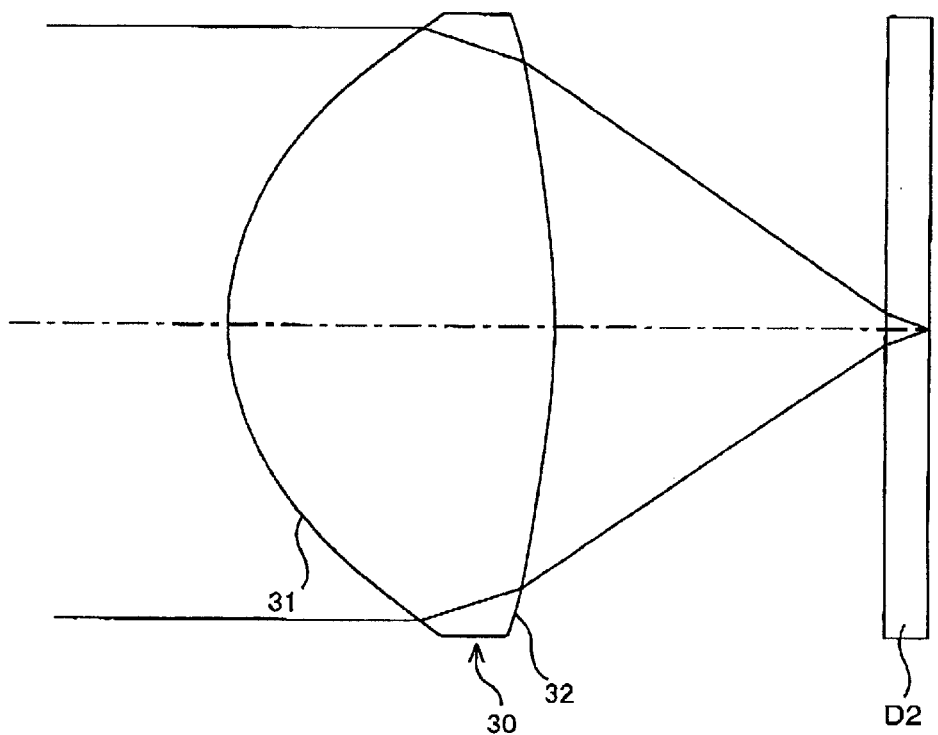
FIG. 9 is a lens diagram of the objective optical system according to a fourth embodiment.

FIG. 9 shows an objective optical system of the fourth embodiment and an optical disc D2 having a cover layer of 0.2 mm in thickness. The objective optical system of the fourth embodiment consists of an objective lens 30. The diffractive lens structure is formed on a first surface 31 of the objective lens 30. The numerical constructions of the fourth embodiment are described in TABLE 4.

TABLE 4

| λ: 405 nm | f: 2.5 mm | NA: 0.60 | |
|---|---|---|---|
| $nL_{405}$: 1.44185 | $\Delta nL$: $-7.5 \times 10^{-5}$/nm | tL: 1.50 mm | v: 95.0 |
| $nd_{405}$: 1.62231 | $\Delta nd$: $-4.1 \times 10^{-4}$/nm | td: 0.20 mm | |
| uh_d: 1.50 mm | m: 1 | | |

| | First surface | Second surface |
|---|---|---|
| r | 1.431 | −4.030 |
| κ | −0.4800 | 0.0000 |
| A4 | $-8.80000 \times 10^{-3}$ | $2.40000 \times 10^{-2}$ |
| A6 | $1.00000 \times 10^{-3}$ | $3.08000 \times 10^{-2}$ |
| A8 | $-5.40000 \times 10^{-4}$ | $-3.30000 \times 10^{-2}$ |
| A10 | $1.10000 \times 10^{-3}$ | $1.19000 \times 10^{-2}$ |
| A12 | $-6.00000 \times 10^{-4}$ | $-1.62000 \times 10^{-3}$ |
| P2 | $-2.2800 \times 10$ | — |
| P4 | −2.0000 | — |
| P6 | $-2.4000 \times 10^{-1}$ | — |

Figure 10A:
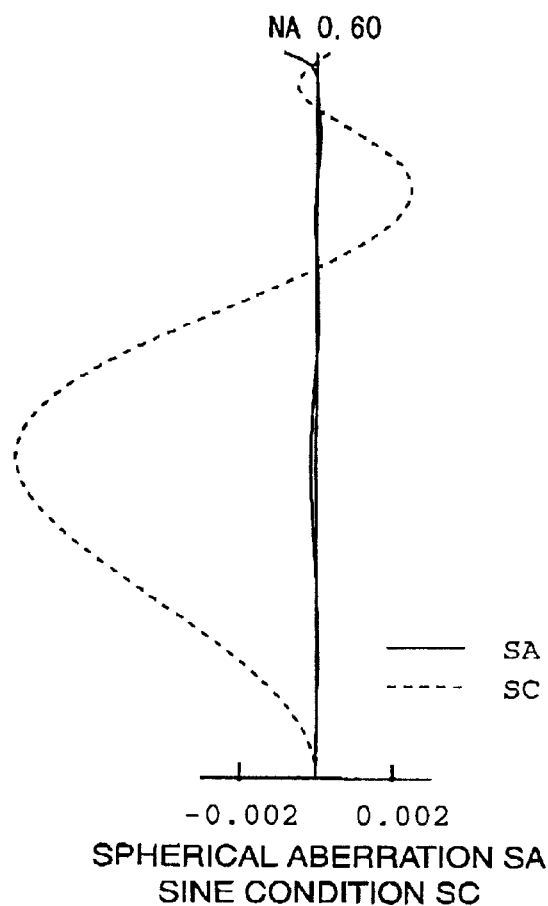
FIGS. 10A and 10B are graphs showing spherical aberration with sine condition and chromatic aberration, respectively, of the objective optical system according to the fourth embodiment.
Figure 10B:
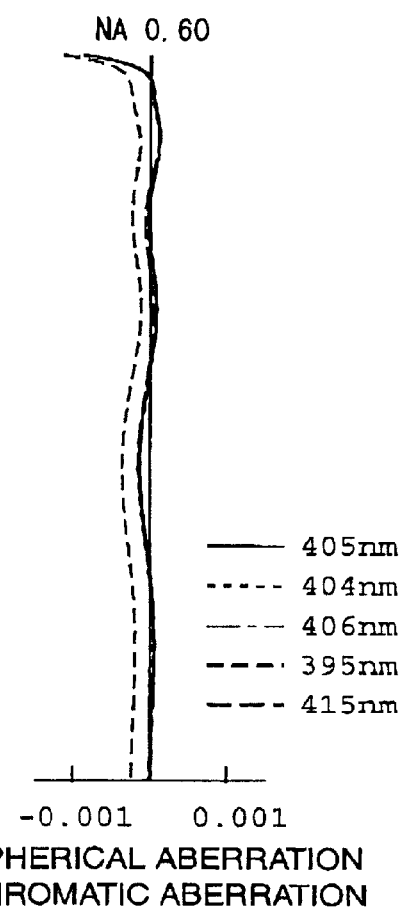
Figure 11:
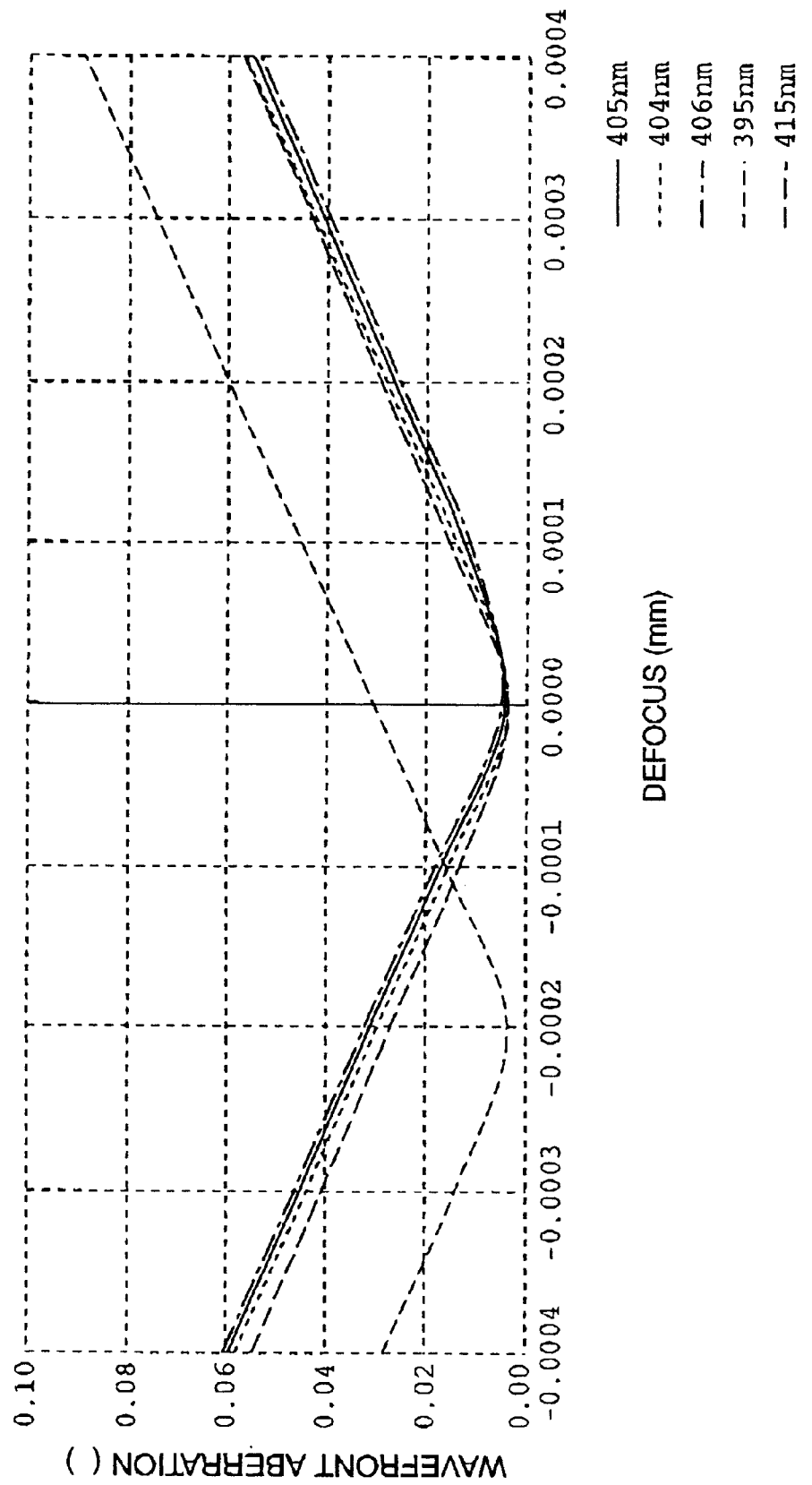
FIG. 11 is a graph showing a relationship between the rms value of the wavefront aberration and defocus in the objective optical system of the fourth embodiment.

FIG. 10A is a graph showing spherical aberration SA with sine condition SC at wavelength 405 nm when the objective lens 30 of the fourth embodiment is applied to the optical disc D2, FIG. 10B is a graph showing chromatic aberration represented by spherical aberration at wavelengths of 405 nm, 404 nm, 406 nm, 395 nm and 415 nm. FIG. 11 is a graph showing a relationship between the rms value of the wavefront aberration and defocus at wavelengths of 405 nm, 404 nm, 406 nm, 395 nm and 415 nm according to the fourth embodiment.

FIG. 10B and FIG. 11 show that the curves of the spherical aberration and the minimum points of the wavefront aberration are in close agreement with one another at the wavelengths except 395 nm. Namely, these graphs make it clear that the lens of the fourth embodiment is adequately corrected in the chromatic aberration within the wavelength range 404–415 nm.

Fifth Embodiment

The following TABLE 5 shows the numerical constructions of the objective optical system according to the fifth embodiment. The objective optical system of the fifth embodiment also consists of a single objective lens. The diffractive lens structure is formed on the first surface of the objective lens. Since the shape of the objective lens is similar to the first embodiment, a drawing of the lens is omitted.

TABLE 5

| λ: 405 nm | f: 2.5 mm | NA: 0.80 | |
|---|---|---|---|
| $nL_{405}$: 1.44185 | $\Delta nL$: $-7.5 \times 10^{-5}$/nm | tL: 2.60 mm | v: 95.0 |
| $nd_{405}$: 1.62231 | $\Delta nd$: $-4.1 \times 10^{-4}$/nm | td: 0.60 mm | |
| uh_d: 2.00 mm | m: 1 | | |

| | First surface | Second surface |
|---|---|---|
| r | 1.480 | −2.182 |
| κ | −0.6500 | 0.0000 |
| A4 | $1.82000 \times 10^{-3}$ | $1.11200 \times 10^{-1}$ |
| A6 | $-4.30000 \times 10^{-4}$ | $-2.24000 \times 10^{-2}$ |
| A8 | $1.70000 \times 10^{-4}$ | $-8.33000 \times 10^{-3}$ |
| A10 | $-5.68000 \times 10^{-6}$ | $9.20000 \times 10^{-3}$ |
| A12 | $-2.94000 \times 10^{-5}$ | $-3.24000 \times 10^{-3}$ |
| A14 | $5.25000 \times 10^{-5}$ | $4.49000 \times 10^{-4}$ |
| A16 | $-2.48200 \times 10^{-5}$ | $3.73400 \times 10^{-5}$ |
| A18 | $4.62000 \times 10^{-6}$ | $-1.98100 \times 10^{-5}$ |
| A20 | $-3.47000 \times 10^{-7}$ | $1.86480 \times 10^{-6}$ |
| P2 | $-1.5520 \times 10$ | — |
| P4 | −9.0000 | — |
| P6 | $-3.7500 \times 10^{-1}$ | — |

Figure 13:
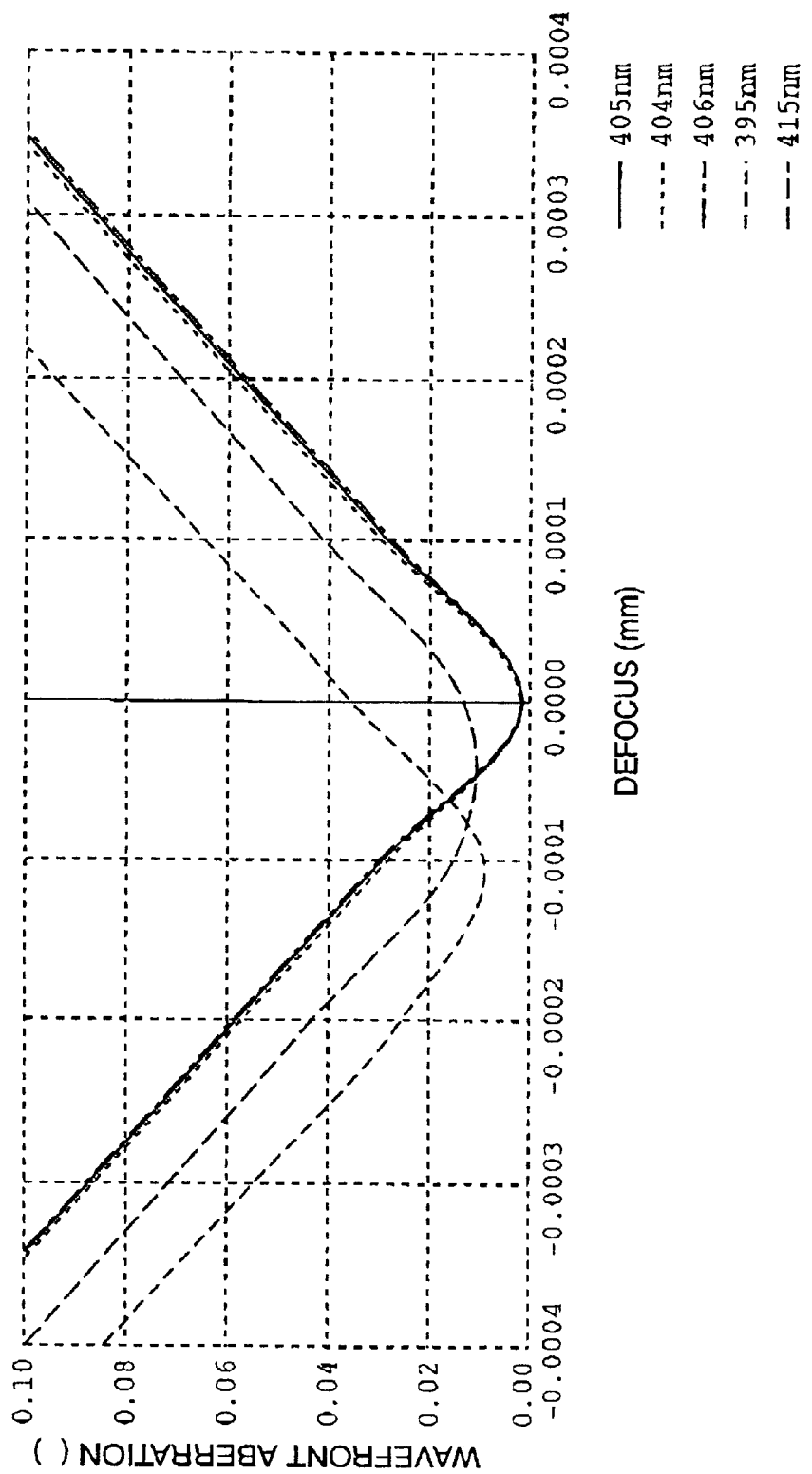
FIG. 13 is a graph showing a relationship between the rms value of the wavefront aberration and defocus in the objective optical system of the fifth embodiment.

FIG. 12A is a graph showing spherical aberration SA with sine condition SC at wavelength 405 nm when the objective lens of the fifth embodiment is applied to the optical disc D1, FIG. 12B is a graph showing chromatic aberration represented by spherical aberration at wavelengths of 405 nm, 404 nm, 406 nm, 395 nm and 415 nm. FIG. 13 is a graph showing a relationship between the rms value of the wavefront aberration and defocus at wavelengths of 405 nm, 404 nm, 406 nm, 395 nm and 415 nm according to the fifth embodiment.

FIG. 12B and FIG. 13 show that the curves of the spherical aberration and the minimum points of the wavefront aberration are in close agreement with one another at the wavelengths except 395 nm and 415 nm. Namely, these graphs make it clear that the lens of the fifth embodiment is adequately corrected in the chromatic aberration within the wavelength range 404–406 nm.

Sixth Embodiment

Figure 14:
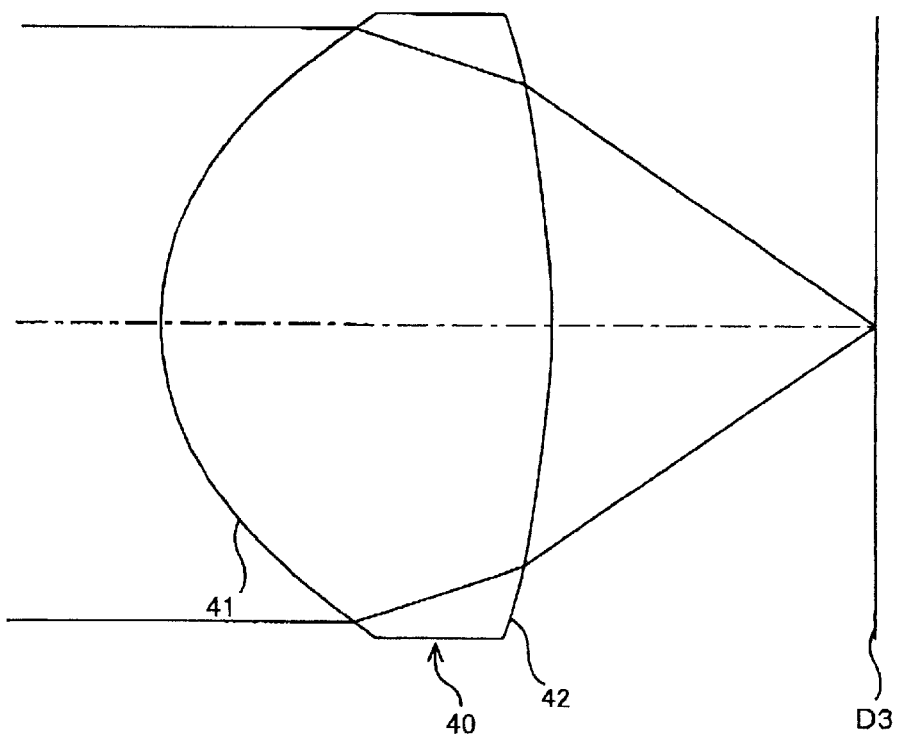
FIG. 14 is a lens diagram of the objective optical system according to a sixth embodiment.

FIG. 14 shows an objective optical system of the sixth embodiment and an optical disc D3 that does not have a cover layer. The objective optical system of the sixth embodiment consists of an objective lens 40. The diffractive lens structure is formed on a first surface 41 of the objective lens 40. The numerical constructions of the sixth embodiment are described in TABLE 6.

TABLE 6

| λ: 405 nm | f: 2.5 mm | NA: 0.60 | |
|---|---|---|---|
| $nL_{405}$: 1.44185 | $\Delta nL$: $-7.5 \times 10^{-5}$/nm | tL: 1.80 mm | v: 95.0 |
| uh_d: 1.50 mm | m: 1 | | |

| | First surface | Second surface |
|---|---|---|
| r | 1.459 | −3.428 |
| κ | −0.4800 | 0.0000 |
| A4 | $2.00000 \times 10^{-3}$ | $1.13300 \times 10^{-1}$ |
| A6 | $1.35000 \times 10^{-5}$ | $-8.66000 \times 10^{-2}$ |
| A8 | $-1.00000 \times 10^{-3}$ | $3.79000 \times 10^{-2}$ |
| A10 | $1.60000 \times 10^{-4}$ | $-9.34000 \times 10^{-3}$ |
| A12 | $-2.28650 \times 10^{-4}$ | $9.74800 \times 10^{-4}$ |
| P2 | $-2.5000 \times 10$ | — |
| P4 | −1.4000 | — |
| P6 | $-5.0000 \times 10^{-1}$ | — |

Figure 16:
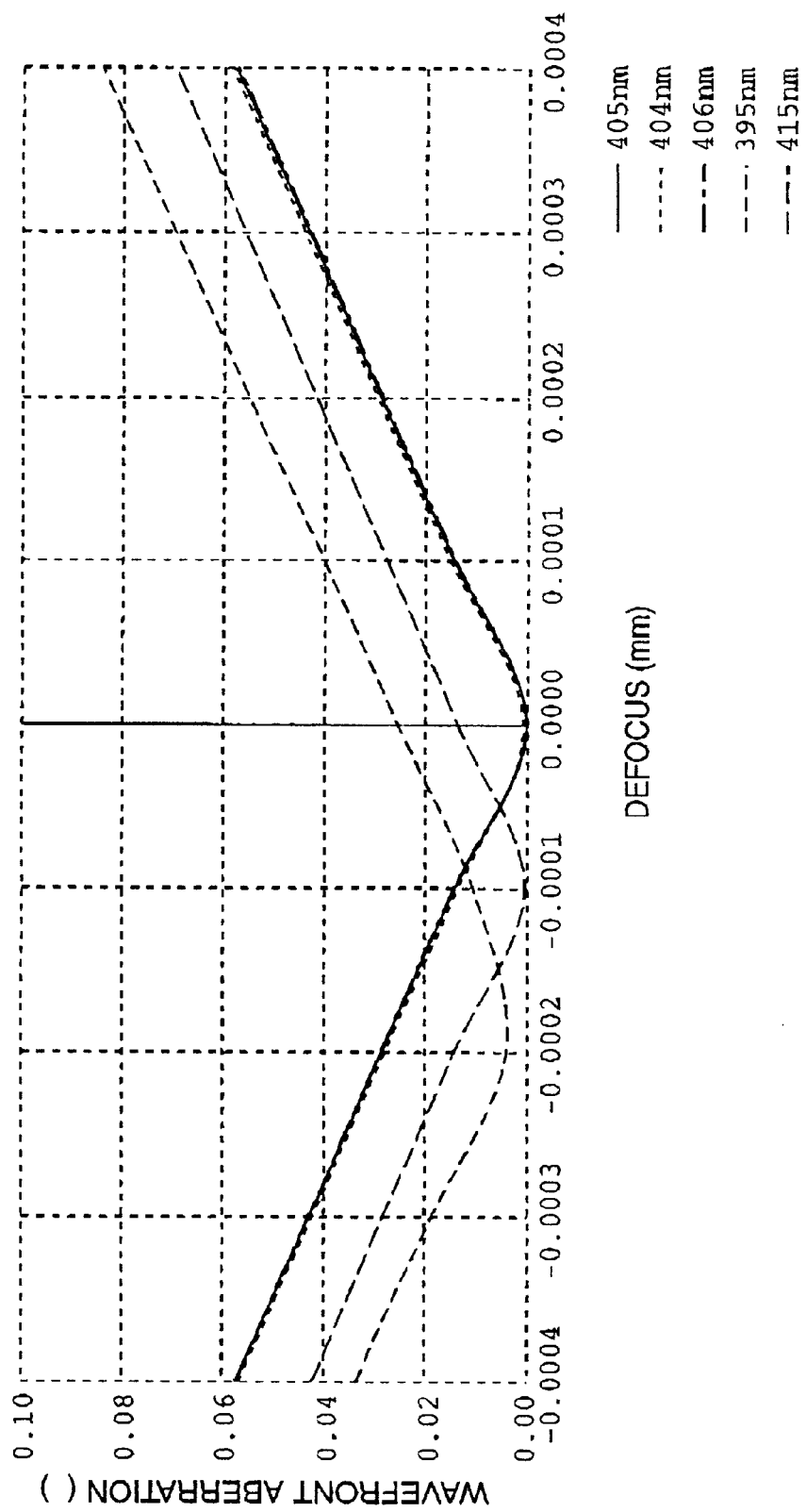
FIG. 16 is a graph showing a relationship between the rms value of the wavefront aberration and defocus in the objective optical system of the sixth embodiment.

FIG. 15A is a graph showing spherical aberration SA with sine condition SC at wavelength 405 nm when the objective lens of the sixth embodiment is applied to the optical disc D3, FIG. 15B is a graph showing chromatic aberration represented by spherical aberration at wavelengths of 405 nm, 404 nm, 406 nm, 395 nm and 415 nm. FIG. 16 is a graph showing a relationship between the rms value of the wavefront aberration and defocus at wavelengths of 405 nm, 404 nm, 406 nm, 395 nm and 415 nm according to the fifth embodiment.

FIG. 15B and FIG. 16 show that the curves of the spherical aberration and the minimum points of the wavefront aberration are in close agreement with one another at the wavelengths except 395 nm and 415 nm. Namely, these graphs make it clear that the lens of the fifth embodiment is adequately corrected in the chromatic aberration within the wavelength range 404–406 nm.

The following TABLE 7 shows the values of the first through sixth embodiments with respect to the conditions (1), (2), (3) and (4). The first through fifth embodiments satisfy the conditions (1), (2), (3), and the sixth embodiment satisfies the conditions (1), (3), (4). Therefore, the objective optical systems of all of the embodiments are adequately corrected in the chromatic aberration.

TABLE 7

|  |  | Condition | | |
|---|---|---|---|---|
|  |  | (1) | (2), (4) | (3) |
| Upper limit |  | 0.0045 | −0.007 | 0.30 |
| Lower limit |  | — | −0.015 | −0.30 |
| Embodiment | 1 | 0.0029 | −0.0095 | 0.213 |
|  | 2 | 0.0044 | −0.0099 | 0.156 |
|  | 3 | 0.0029 | −0.0077 | −0.237 |
|  | 4 | 0.0029 | −0.0090 | 0.197 |
|  | 5 | 0.0029 | −0.0110 | 0.232 |
|  | 6 | 0.0029 | −0.0088 | 0.126 |

As described above, according to the first through sixth embodiments, since the diffractive lens structure is formed on the single refractive lens and the refractive lens is formed of material whose rate of change of the refractive index is small, it is possible to provide the objective optical system that is well corrected in the chromatic aberration at wavelength shorter than F-line.

Next, the objective optical systems of the seventh through thirteenth embodiments will be described. Each objective optical system of the seventh through thirteenth embodiments consists of a refractive lens and a chromatic aberration correcting element.

Seventh Embodiment

Figure 17:
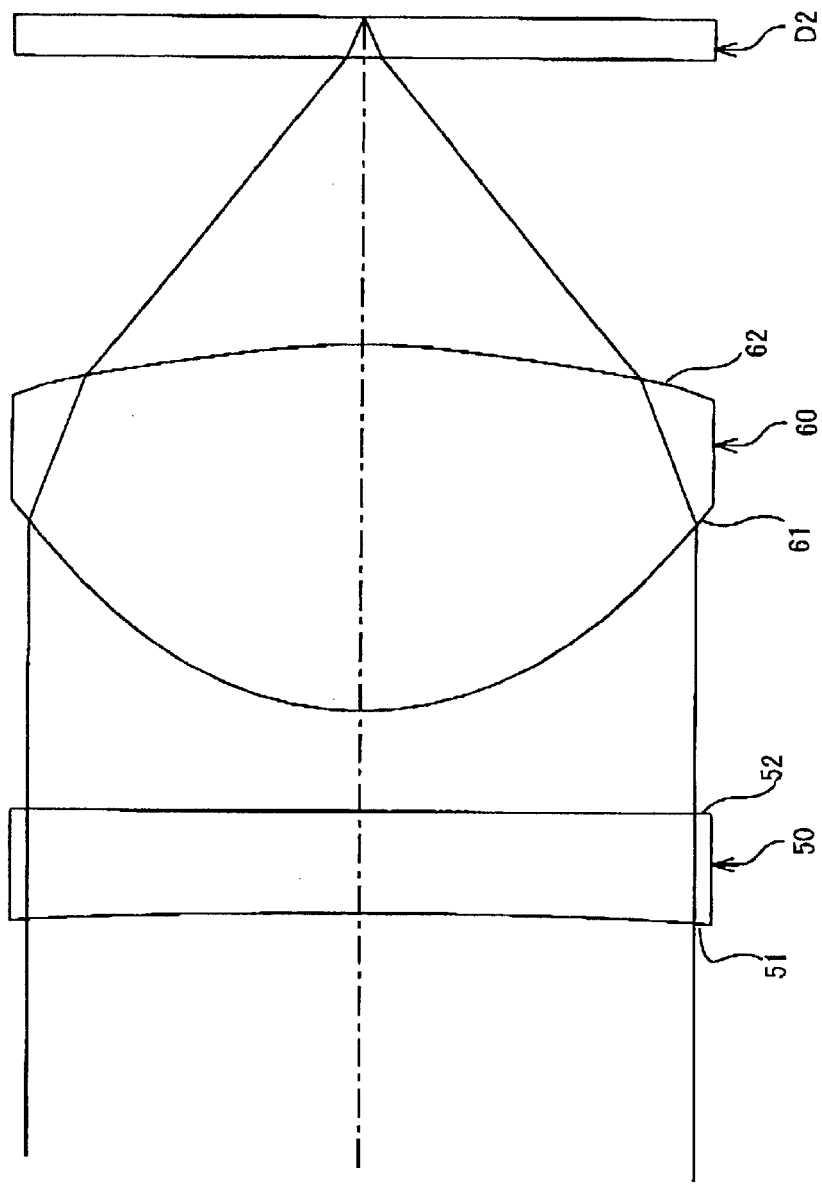
FIG. 17 is a lens diagram of the objective optical system according to a seventh embodiment.

FIG. 17 shows an objective optical system of the seventh embodiment and the optical disc D2 having a cover layer of 0.2 mm in thickness. The objective optical system of the seventh embodiment consists of a chromatic aberration correcting element 50 and a refractive lens 60 that are arranged in the order from a light source side (left hand side in FIG. 17) toward the optical disc D2.

The chromatic aberration correcting element 50 is formed as a substantially flat plate. The diffractive lens structure is formed on the first surface 51 at the light incident side of the chromatic aberration correcting element 50. The second surface 52 thereof is a flat surface. The diffractive lens structure is formed to correct chromatic aberration caused by the refractive lens 60. The chromatic aberration correcting element 50 is made of plastic that has high moldability and high transforming ability and is manufactured through an injection molding process with a molding die in which the pattern of the diffractive lens structure is formed.

The refractive lens 60 is a biconvex lens having first and second surfaces 61 and 62 that are aspherical surfaces whose radii of curvature increase as heights from the optical axis become large. The refractive lens 60 is located between the chromatic aberration correcting element 50 and the optical disc D2 to keep a sufficient back focus (a working distance). The refractive lens 60 is arranged such that the surface having larger power faces the chromatic aberration correcting element 50.

The refractive lens 60 of the seventh embodiment is made of material that satisfies the condition (1).

$$1/(\nu^3 \times \lambda \times 10^{-6}) < 0.0045 \quad (1)$$

On the other hand, the chromatic aberration correcting element 50 and the refractive lens 60 satisfy the following condition (5);

$$|\Delta nC/\Delta nL| > 2 \quad (5)$$

where $\Delta nC$ is the rate of change of the refractive index of the chromatic aberration correcting element represented by the following equation, $$\Delta nC = (nC_{+1} - nC_{-1})/2$$

$nC_{+1}$ is the refractive index of the chromatic aberration correcting element at the wavelength $(\lambda+1)$ nm; and $nC_{-1}$ is the refractive index of the chromatic aberration correcting element at the wavelength $(\lambda-1)$ nm.

When the condition (1) is satisfied, the wavelength dependence of the refractive index of the refractive lens 60 can be kept small at the working wavelength, which reduces the chromatic aberration caused by the refractive lens 60. As a result, the diffractive lens structure formed on the chromatic aberration correcting element 50 adequately corrects the chromatic aberration caused by the refractive lens 60.

Further, since the rate of change of the refractive index of the chromatic aberration correcting element 50 is larger than that of the refractive lens 60 as defined in the condition (5), the chromatic aberration is adequately corrected. When the upper limit of the condition (1) is exceeded, the chromatic aberration caused by the refractive lens 60 becomes too large. When the ratio of the condition (5) is smaller than 2, the correcting effect of the chromatic aberration correcting element 50 as a refractive element becomes too small. In either case, since the chromatic aberration to be corrected by the diffractive lens structure becomes too large, the number of ring-shaped steps increases and the width of each ring-shaped step decreases, which results in difficult manufacturing and a reduction of diffraction efficiency.

The chromatic aberration correcting element 50 has no power at the working wavelength $\lambda$ and has a correcting effect of the chromatic aberration only. That is, the positive diffractive power of the diffractive lens structure and the negative refractive power of the chromatic aberration correcting element 50 as a refractive element are counterbalanced at the working wavelength $\lambda$. Therefore, the chromatic aberration correcting element 50 has a function of a negative refractive lens, which reduces the chromatic aberration caused by the positive refractive lens. As a result, when the chromatic aberration correcting element 50 is made of material whose wavelength dependence of the refractive index is large, the chromatic aberration correcting function required for the diffractive lens structure becomes small, which reduces the number of the ring-shaped steps, increasing moldability and transforming ability.

On the other hand, since the diffractive lens structure is not formed on the refractive lens, it is unnecessary to take moldability and transforming ability into account when the refractive lens is designed, the refractive lens 60 can be made of lens material whose wavelength dependence of the refractive index is small as defined in the condition (1).

Further, since deformation and variation of refractive index of the refractive lens made of glass due to temperature change can become negligible, the diffractive lens structure can be designed without consideration of the deformation and the variation of the refractive index of the refractive lens 60.

The base curve of the first surface 51 of the chromatic aberration correcting element 50, the first and second surfaces 61 and 62 of the refractive lens 60 are rotationally-symmetrical aspherical surfaces. The aspherical surface is defined by the sag as described above.

The following equations should be held to make the chromatic aberration correcting element 50 have no power at the working wavelength $\lambda$.

$1/C = r = (n_1 - n_0)/(2 \cdot P_2 \cdot m \cdot \lambda)$ $\kappa = -1$ $A_i = \{m \cdot \lambda/(n_1 - n_0)\} P_i \ (i \geq 4)$ Where $n_1$: refractive index of medium at the exit side of the surface on which the diffractive lens structure is formed at the working wavelength, and $n_0$: refractive index of medium at the incident side of the surface on which the diffractive lens structure is formed at the working wavelength.

Furthermore, the objective optical system of the seventh embodiment is applied to the optical disc D2 whose information layer is covered by a cover layer of 0.2 mm in thickness and satisfies the following condition (7).

$$0.0001 < [\{-2 \cdot P_2 \cdot m \cdot (1.0 \times 10^{-6}) f + 1\}^{-1} - \{\Delta nL/(nL-1)\} - 1] \cdot f + \Delta nd \cdot td/nd^2 < 0.0003 \quad (7)$$

The condition (7) defines the diffraction effect caused by the diffractive lens structure when the objective optical system is applied to an optical disc having a transparent cover layer. When the condition (7) is satisfied, the chromatic aberration can be adequately corrected. If the intermediate term is lower than the lower limit of the condition (7), the correcting effect of the diffractive lens structure becomes short. If the intermediate term is larger than the upper limit of the condition (2), the correcting effect of the diffractive lens structure becomes excessive.

Further, the diffractive lens structure formed on the chromatic aberration correcting element 50 is designed to use the first order diffraction light. However, any order diffraction lights can be used.

The numerical constructions of the seventh embodiment are described in TABLE 8 and TABLE 9. In TABLE 8, surface numbers #1 and #2 represent the chromatic aberration correcting element 50, surface numbers #3 and #4 represent the refractive lens 60 and surface numbers #5 and #6 represent the cover layer of the optical disc D2. Further, r (mm) denotes a radius of curvature of a surface (the values at the vertex for an aspherical surface), d (mm) denotes a distance between the surfaces along the optical axis, n denotes a refractive index and Δn denotes a ratio of change of the refractive index. The coefficients to define the diffractive lens structure and the aspherical surfaces are shown in TABLE 9.

TABLE 8

| λ: 405 nm | | f: 2.5 mm | NA: 0.60 | ν: 95.0 |
|---|---|---|---|---|
| Surface number | r | d | n | Δn |
| #1 | −32.935 | 0.500 | 1.5602 | −16.5 × 10$^{-5}$ |
| #2 | ∞ | 0.500 | — | — |
| #3 | 1.400 | 1.800 | 1.4419 | −7.5 × 10$^{-5}$ |
| #4 | −3.172 | 1.392 | — | — |
| #5 | ∞ | 0.200 | 1.6223 | −41.0 × 10$^{-5}$ |
| #6 | ∞ | — | — | — |

TABLE 9

| | Correcting element | Refractive lens | |
|---|---|---|---|
| | First surface | First surface | Second surface |
| κ | −1.0000 | −0.4800 | 0.0000 |
| A4 | −1.0988 × 10$^{-3}$ | −7.5000 × 10$^{-3}$ | 5.2000 × 10$^{-2}$ |
| A6 | −2.5447 × 10$^{-4}$ | 1.1800 × 10$^{-4}$ | 1.1440 × 10$^{-2}$ |
| A8 | 0.0000 | −9.8400 × 10$^{-4}$ | −2.8680 × 10$^{-2}$ |
| A10 | 0.0000 | 9.3360 × 10$^{-4}$ | 1.3060 × 10$^{-2}$ |
| A12 | 0.0000 | −4.8700 × 10$^{-4}$ | −2.0840 × 10$^{-3}$ |
| P2 | −2.1000 × 10 | — | — |
| P4 | −1.5200 | — | — |
| P6 | −3.5200 × 10$^{-1}$ | — | — |

Figure 19:
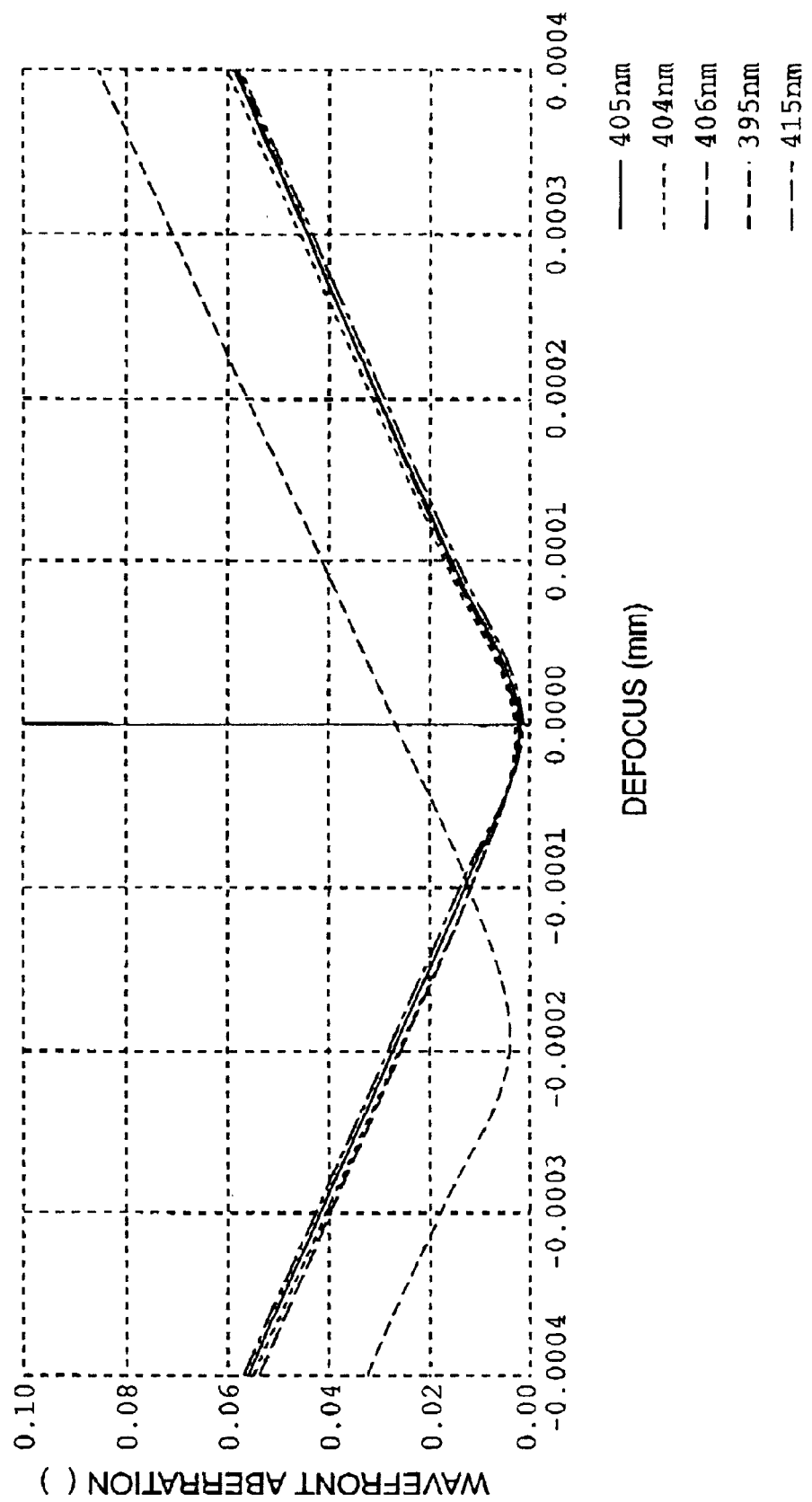
FIG. 19 is a graph showing a relationship between the rms value of the wavefront aberration and defocus in the objective optical system of the seventh embodiment.

FIG. 18A is a graph showing spherical aberration SA with sine condition SC at wavelength 405 nm when the objective optical system of the seventh embodiment is applied to the optical disc D2, FIG. 18B is a graph showing chromatic aberration represented by spherical aberration at wavelengths of 405 nm, 404 nm, 406 nm, 395 nm and 415 nm. FIG. 19 is a graph showing a relationship between the rms value of the wavefront aberration and defocus at wavelengths of 405 nm, 404 nm, 406 nm, 395 nm and 415 nm according to the seventh embodiment.

FIG. 18B and FIG. 19 show that the curves of the spherical aberration and the minimum points of the wavefront aberration are in close agreement with one another at the wavelengths except 395 nm. Namely, these graphs make it clear that the lens of the seventh embodiment is adequately corrected in the chromatic aberration within the wavelength range 404–415 nm.

Eighth Embodiment

Figure 20:
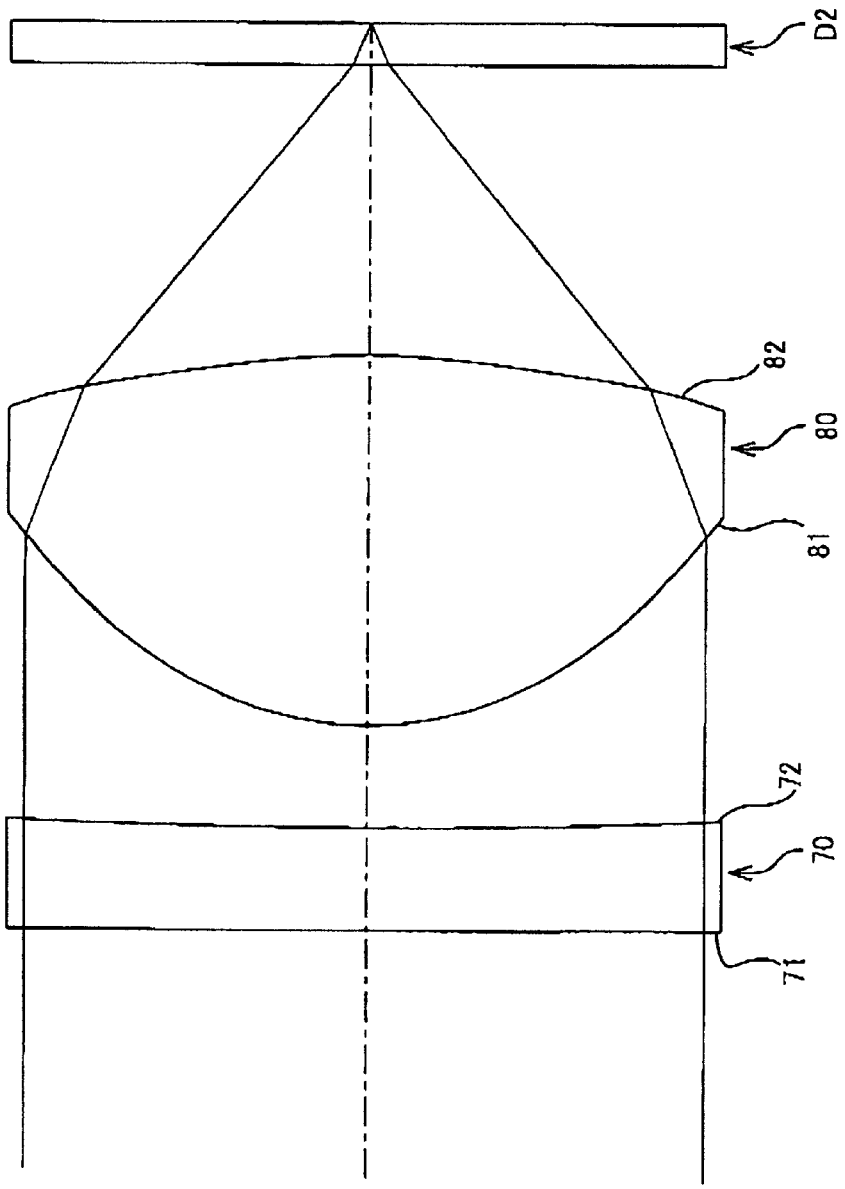
FIG. 20 is a lens diagram of the objective optical system according to an eighth embodiment.

FIG. 20 shows an objective optical system of the eighth embodiment and an optical disc D2 having a cover layer of 0.2 mm in thickness. The objective optical system of the eighth embodiment consists of a chromatic aberration correcting element 70 made of plastic and a refractive lens 80 made of glass. The diffractive lens structure is formed on a second surface 72 of the chromatic aberration correcting element 70. The objective optical system of the eighth embodiment satisfies the conditions (1), (7) and further satisfies the following condition (6) that is similar to but more strict than the condition (5).

$$|\Delta nC/\Delta nL| > 4 \quad (6)$$

When the condition (6) is satisfied, the ratio of change of the refractive index of the chromatic aberration correcting element 70 becomes smaller, which allows reducing the number of the ring-shaped steps of the diffractive lens structure while keeping the adequate correcting effect.

The numerical constructions of the eighth embodiment are described in TABLE 10 and TABLE 11. The definitions of the surface numbers and the symbols are identical with that of the seventh embodiment.

TABLE 10

| λ: 405 nm | | f: 2.5 mm | NA: 0.60 | ν: 95.0 |
|---|---|---|---|---|
| Surface number | r | d | n | Δn |
| #1 | ∞ | 0.500 | 1.6223 | −41.0 × 10$^{-5}$ |
| #2 | 40.866 | 0.500 | — | — |
| #3 | 1.400 | 1.800 | 1.4419 | −7.5 × 10$^{-5}$ |

TABLE 10-continued

λ: 405 nm    f: 2.5 mm    NA: 0.60    ν: 95.0

| Surface number | r | d | n | Δn |
|---|---|---|---|---|
| #4 | −3.172 | 1.392 | — | — |
| #5 | ∞ | 0.200 | 1.6223 | −41.0 × 10⁻⁵ |
| #6 | ∞ | — | — | — |

TABLE 11

| | Correcting element | Refractive lens | |
|---|---|---|---|
| | Second surface | First surface | Second surface |
| κ | −1.0000 | −0.4800 | 0.0000 |
| A4 | 7.8096 × 10⁻⁴ | −7.5000 × 10⁻³ | 5.2000 × 10⁻² |
| A6 | 2.3429 × 10⁻⁴ | 1.1800 × 10⁻⁴ | 1.1440 × 10⁻² |
| A8 | 0.0000 | −9.8400 × 10⁻⁴ | −2.8680 × 10⁻² |
| A10 | 0.0000 | 9.3360 × 10⁻⁴ | 1.3060 × 10⁻² |
| A12 | 0.0000 | −4.8700 × 10⁻⁴ | −2.0840 × 10⁻³ |
| P2 | −1.8800 × 10 | — | — |
| P4 | −1.2000 | — | — |
| P6 | −3.6000 × 10⁻¹ | — | — |

Figure 22:
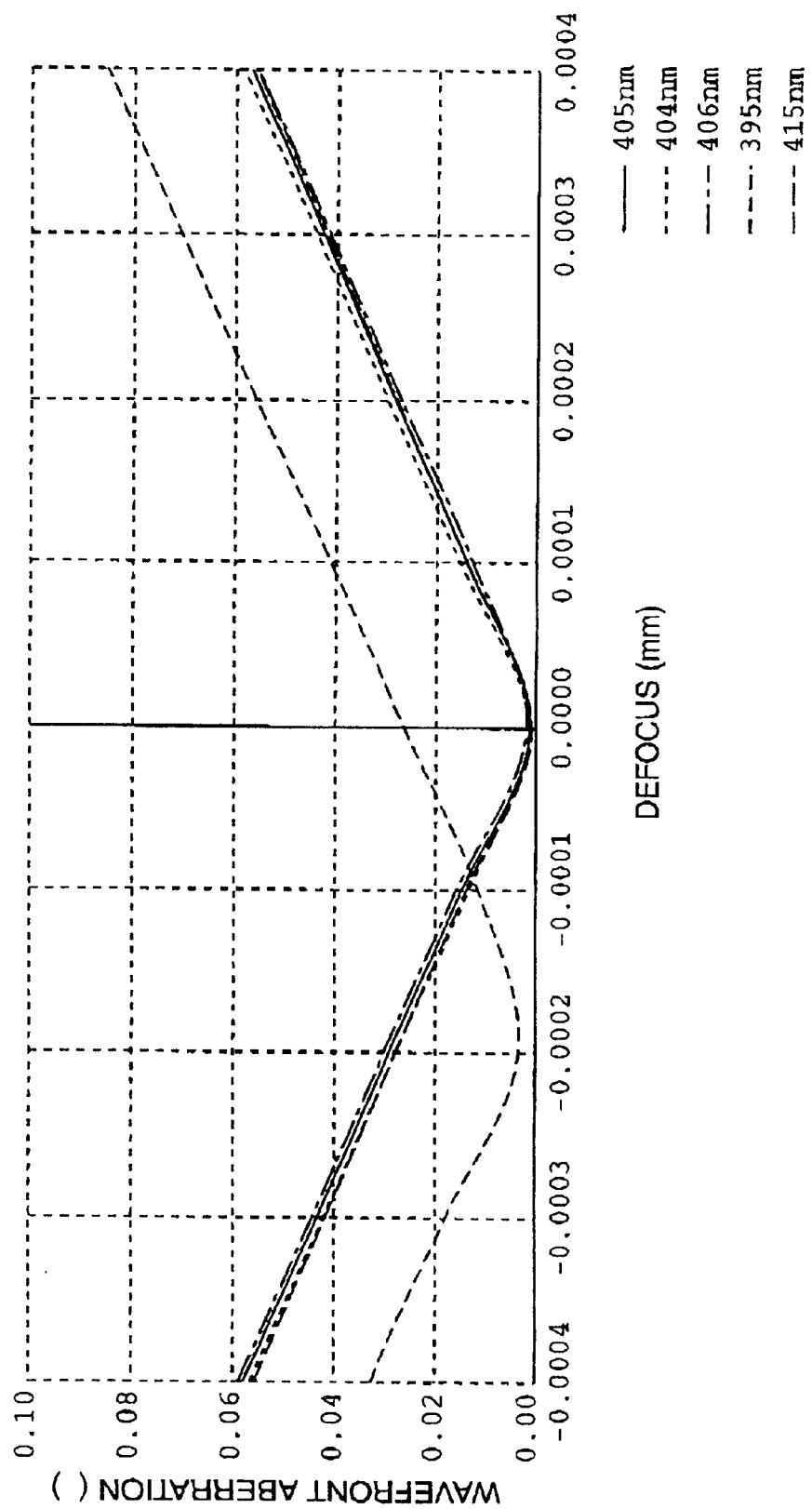
FIG. 22 is a graph showing a relationship between the rms value of the wavefront aberration and defocus in the objective optical system of the eighth embodiment.

FIG. 21A is a graph showing spherical aberration SA with sine condition SC at wavelength 405 nm when the objective optical system of the eighth embodiment is applied to the optical disc D2, FIG. 21B is a graph showing chromatic aberration represented by spherical aberration at wavelengths of 405 nm, 404 nm, 406 nm, 395 nm and 415 nm. FIG. 22 is a graph showing a relationship between the rms value of the wavefront aberration and defocus at wavelengths of 405 nm, 404 nm, 406 nm, 395 nm and 415 nm according to the eighth embodiment.

FIG. 21B and FIG. 22 show that the curves of the spherical aberration and the minimum points of the wavefront aberration are in close agreement with one another at the wavelengths except 395 nm. Namely, these graphs make it clear that the lens of the eighth embodiment is adequately corrected in the chromatic aberration within the wavelength range 404–415 nm.

Ninth Embodiment

Figure 23:
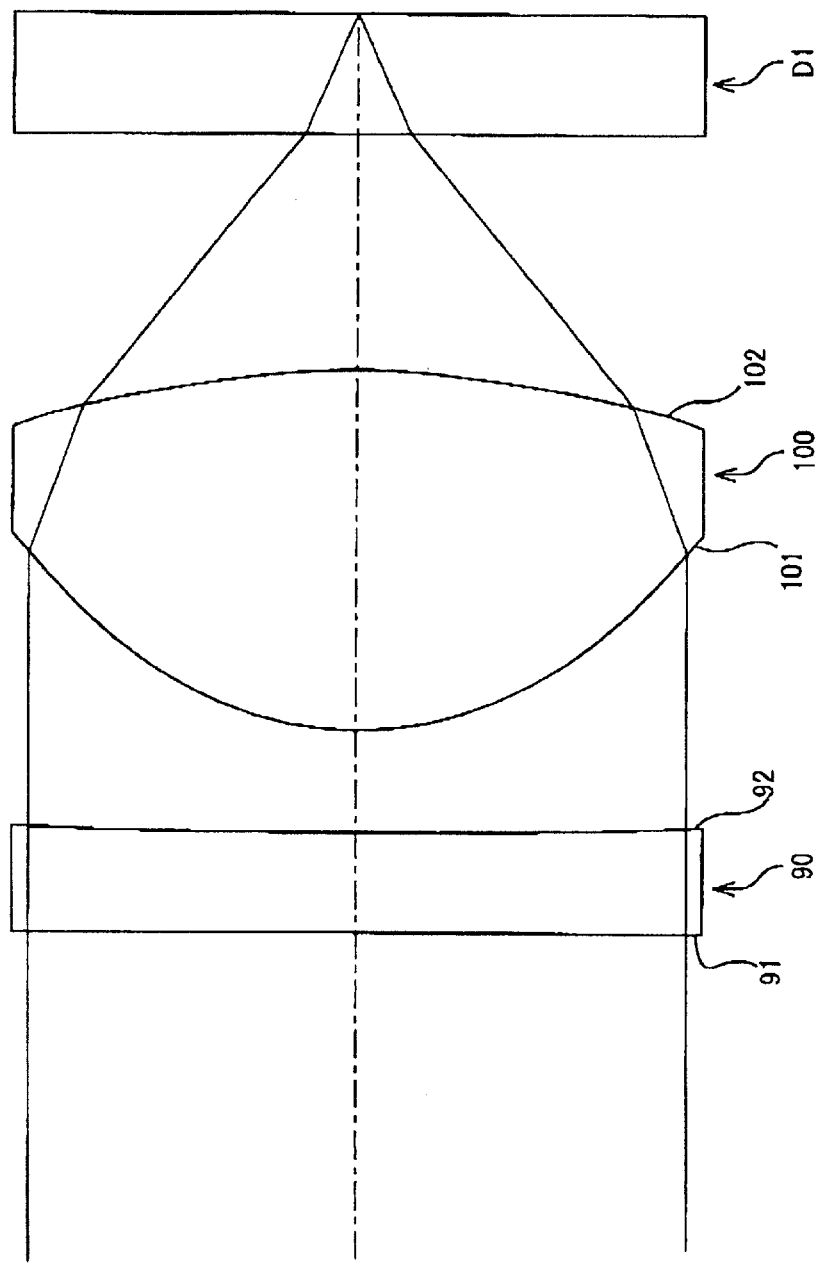
FIG. 23 is a lens diagram of the objective optical system according to a ninth embodiment.

FIG. 23 shows an objective optical system of the ninth embodiment and an optical disc D1 having a cover layer of 0.6 mm in thickness. The objective optical system of the ninth embodiment consists of a chromatic aberration correcting element 90 made of plastic and a refractive lens 100 made of glass. The diffractive lens structure is formed on a second surface 92 of the chromatic aberration correcting element 90. The objective optical system of the ninth embodiment satisfies the conditions (1), (6) and (7).

The numerical constructions of the ninth embodiment are described in TABLE 12 and TABLE 13.

TABLE 12

λ: 405 nm    f: 2.5 mm    NA: 0.60    ν: 95.0

| Surface number | r | d | n | Δn |
|---|---|---|---|---|
| #1 | ∞ | 0.500 | 1.6223 | −41.0 × 10⁻⁵ |
| #2 | 51.218 | 0.500 | — | — |
| #3 | 1.434 | 1.800 | 1.4419 | −7.5 × 10⁻⁵ |
| #4 | −2.959 | 1.168 | — | — |

TABLE 12-continued

λ: 405 nm    f: 2.5 mm    NA: 0.60    ν: 95.0

| Surface number | r | d | n | Δn |
|---|---|---|---|---|
| #5 | ∞ | 0.600 | 1.6223 | −41.0 × 10⁻⁵ |
| #6 | ∞ | — | — | — |

TABLE 13

| | Correcting element | Refractive lens | |
|---|---|---|---|
| | Second surface | First surface | Second surface |
| κ | −1.0000 | −0.4800 | 0.0000 |
| A4 | 6.5080 × 10⁻⁴ | −6.6750 × 10⁻³ | 5.6000 × 10⁻² |
| A6 | 2.0826 × 10⁻⁴ | 2.3300 × 10⁻⁴ | 6.4900 × 10⁻³ |
| A8 | 0.0000 | −7.3800 × 10⁻⁴ | −2.3600 × 10⁻² |
| A10 | 0.0000 | 7.0700 × 10⁻⁴ | 1.0830 × 10⁻² |
| A12 | 0.0000 | −4.0400 × 10⁻⁴ | −1.7163 × 10⁻³ |
| P2 | −1.5000 × 10 | — | — |
| P4 | −1.0000 | — | — |
| P6 | −3.2000 × 10⁻¹ | — | — |

FIG. 24A is a graph showing spherical aberration SA with sine condition SC at wavelength 405 nm when the objective optical system of the ninth embodiment is applied to the optical disc D1, FIG. 24B is a graph showing chromatic aberration represented by spherical aberration at wavelengths of 405 nm, 404 nm, 406 nm, 395 nm and 415 nm. FIG. 25 is a graph showing a relationship between the rms value of the wavefront aberration and defocus at wavelengths of 405 nm, 404 nm, 406 nm, 395 nm and 415 nm according to the ninth embodiment.

FIG. 24B and FIG. 25 show that the curves of the spherical aberration and the minimum points of the wavefront aberration are in close agreement with one another at the wavelengths except 395 nm. Namely, these graphs make it clear that the lens of the ninth embodiment is adequately corrected in the chromatic aberration within the wavelength range 404–415 nm.

Tenth Embodiment

Figure 26:
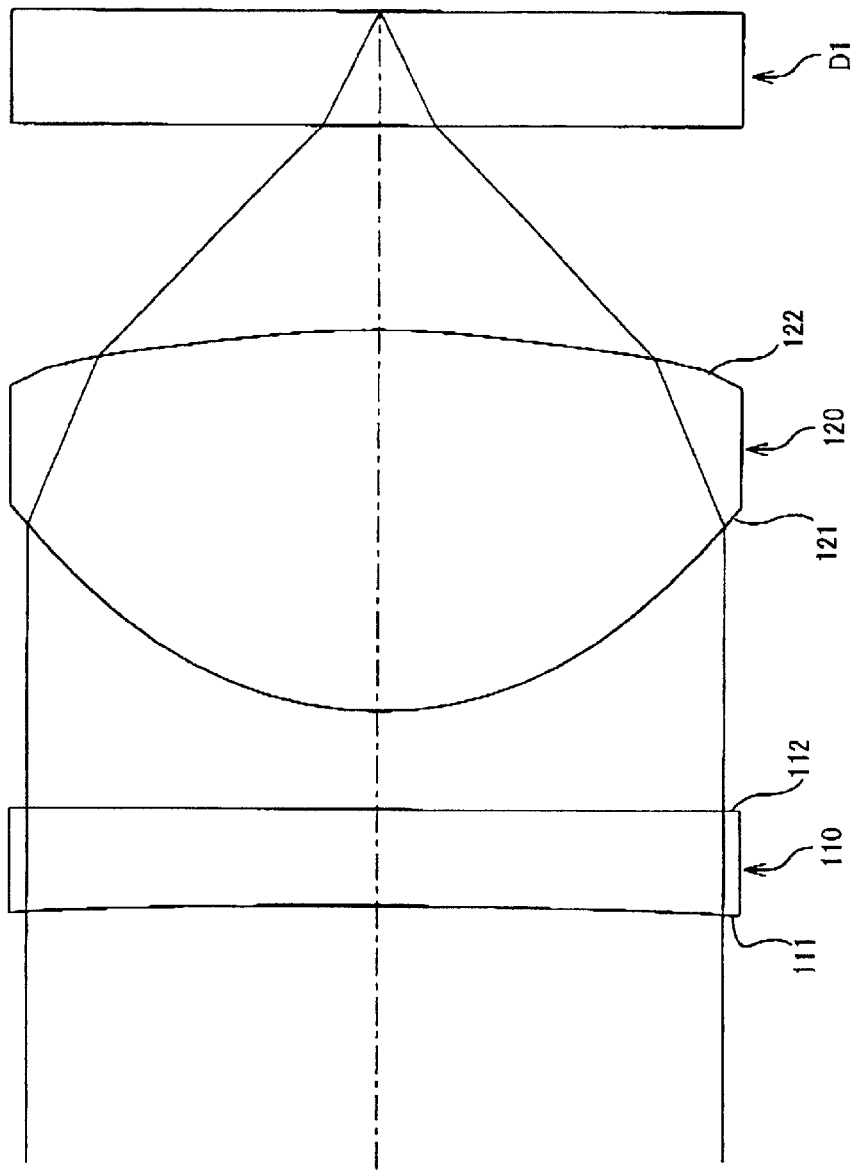
FIG. 26 is a lens diagram of the objective optical system according to a tenth embodiment.

FIG. 26 shows an objective optical system of the tenth embodiment and an optical disc D1 having a cover layer of 0.6 mm in thickness. The objective optical system of the tenth embodiment consists of a chromatic aberration correcting element 110 made of plastic and a refractive lens 120 made of glass. The diffractive lens structure is formed on a first surface 111 of the chromatic aberration correcting element 110. The objective optical system of the tenth embodiment satisfies the conditions (1), (6) and (7).

The numerical constructions of the tenth embodiment are described in TABLE 14 and TABLE 15.

TABLE 14

λ: 420 nm    f: 2.5 mm    NA: 0.65    ν:81.6

| Surface number | r | d | n | Δn |
|---|---|---|---|---|
| #1 | −43.957 | 0.500 | 1.6166 | −35.0 × 10⁻⁵ |
| #2 | ∞ | 0.500 | — | — |
| #3 | 1.567 | 2.000 | 1.5058 | −8.5 × 10⁻⁵ |
| #4 | −3.742 | 1.057 | — | — |

TABLE 14-continued $\lambda$: 420 nm   f: 2.5 mm   NA: 0.65   v:81.6

| Surface number | r | d | n | $\Delta n$ |
|---|---|---|---|---|
| #5 | ∞ | 0.600 | 1.6166 | $-35.0 \times 10^{-5}$ |
| #6 | ∞ | — | — | — |

TABLE 15

| | Correcting element | Refractive lens | |
|---|---|---|---|
| | First surface | First surface | Second surface |
| $\kappa$ | −1.0000 | −0.4800 | 0.0000 |
| A4 | $-5.7895 \times 10^{-4}$ | $-3.7800 \times 10^{-3}$ | $4.4330 \times 10^{-2}$ |
| A6 | $-2.1796 \times 10^{-4}$ | $3.2000 \times 10^{-4}$ | $9.0250 \times 10^{-3}$ |
| A8 | 0.0000 | $-5.2000 \times 10^{-4}$ | $-2.3400 \times 10^{-2}$ |
| A10 | 0.0000 | $4.5500 \times 10^{-4}$ | $1.0400 \times 10^{-2}$ |
| A12 | 0.0000 | $-1.9350 \times 10^{-4}$ | $-1.6040 \times 10^{-3}$ |
| P2 | $-1.6700 \times 10$ | — | — |
| P4 | $-8.5000 \times 10^{-1}$ | — | — |
| P6 | $-3.2000 \times 10^{-1}$ | — | — |

Figure 28:
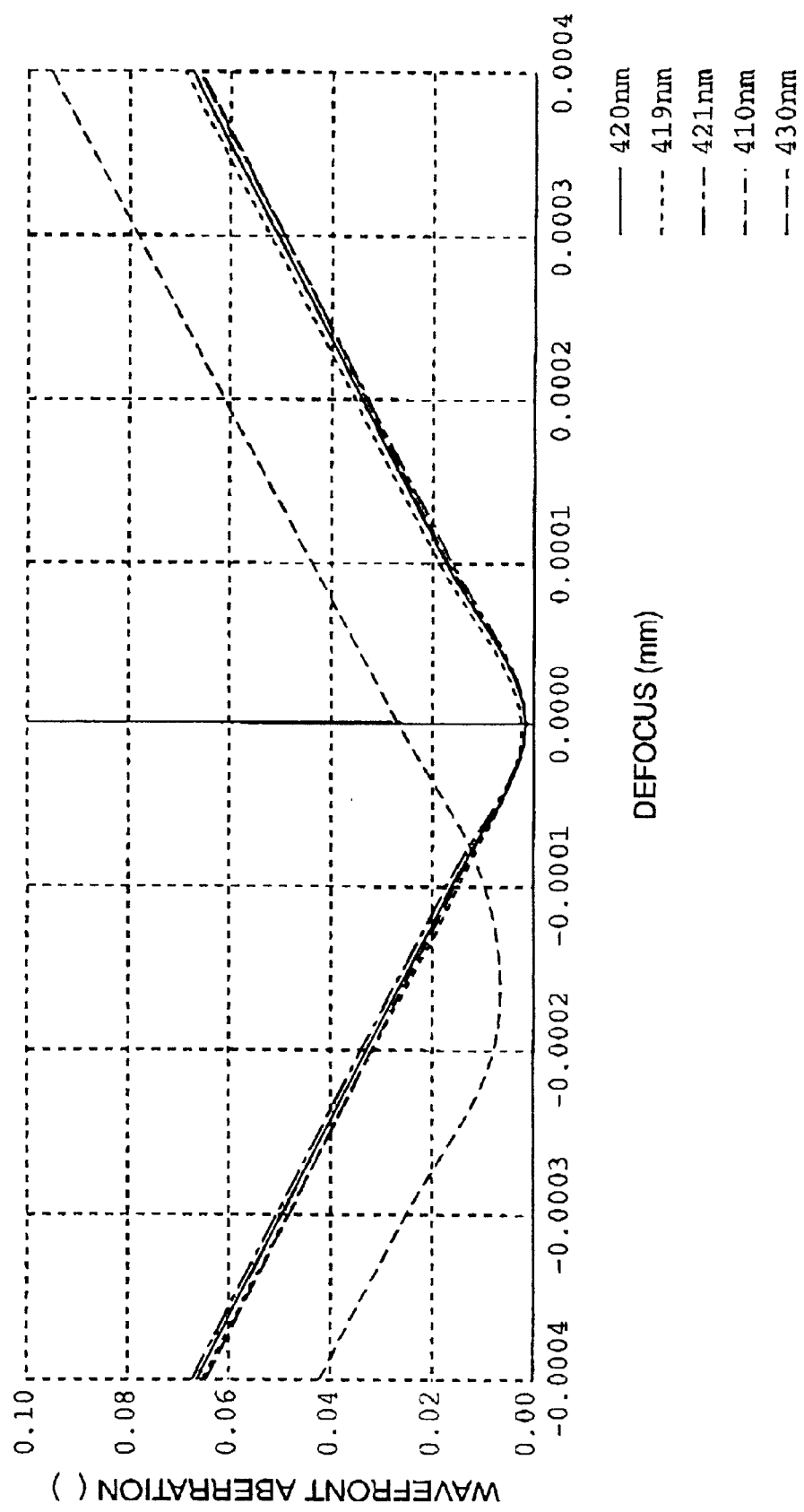
FIG. 28 is a graph showing a relationship between the rms value of the wavefront aberration and defocus in the objective optical system of the tenth embodiment.

FIG. 27A is a graph showing spherical aberration SA with sine condition SC at wavelength 405 nm when the objective optical system of the tenth embodiment is applied to the optical disc D1, FIG. 27B is a graph showing chromatic aberration represented by spherical aberration at wavelengths of 420 nm, 419 nm, 421 nm, 410 nm and 430 nm. FIG. 28 is a graph showing a relationship between the rms value of the wavefront aberration and defocus at wavelengths of 420 nm, 419 nm, 421 nm, 410 nm and 430 nm according to the tenth embodiment.

FIG. 27B and FIG. 28 show that the curves of the spherical aberration and the minimum points of the wavefront aberration are in close agreement with one another at the wavelengths except 410 nm. Namely, these graphs make it clear that the lens of the tenth embodiment is adequately corrected in the chromatic aberration within the wavelength range 419–430 nm.

Eleventh Embodiment

The following TABLE 16 and TABLE 17 shows numerical constructions of an objective optical system of the eleventh embodiment. Since the shape of the objective lens is similar to the tenth embodiment, a drawing of the lens is omitted.

The objective optical system of the eleventh embodiment consists of a chromatic aberration correcting element made of plastic and a refractive lens made of glass. The diffractive lens structure is formed on a first surface of the chromatic aberration correcting element. The objective optical system of the eleventh embodiment is applied to the optical disc D1 having a cover layer of 0.6 mm in thickness and satisfies the conditions (1), (6) and (7).

TABLE 16

$\lambda$: 420 nm   f: 2.5 mm   NA: 0.65   v:81.6

| Surface number | r | d | n | $\Delta n$ |
|---|---|---|---|---|
| #1 | −97.878 | 0.500 | 1.6166 | $-35.0 \times 10^{-5}$ |
| #2 | ∞ | 0.500 | — | — |

TABLE 16-continued $\lambda$: 420 nm   f: 2.5 mm   NA: 0.65   v: 81.6

| Surface number | r | d | n | $\Delta n$ |
|---|---|---|---|---|
| #3 | 1.567 | 2.000 | 1.5058 | $-8.5 \times 10^{-5}$ |
| #4 | −3.742 | 1.057 | — | — |
| #5 | ∞ | 0.600 | 1.6166 | $-35.0 \times 10^{-5}$ |
| #6 | ∞ | — | — | — |

TABLE 17

| | Correcting element | Refractive lens | |
|---|---|---|---|
| | First surface | First surface | Second surface |
| $\kappa$ | −1.0000 | −0.4800 | 0.0000 |
| A4 | $-6.9474 \times 10^{-3}$ | $-3.7800 \times 10^{-3}$ | $4.4330 \times 10^{-2}$ |
| A6 | $1.3282 \times 10^{-3}$ | $3.2000 \times 10^{-4}$ | $9.0250 \times 10^{-3}$ |
| A8 | 0.0000 | $-5.2000 \times 10^{-4}$ | $-2.3400 \times 10^{-2}$ |
| A10 | 0.0000 | $4.5500 \times 10^{-4}$ | $1.0400 \times 10^{-2}$ |
| A12 | 0.0000 | $-1.9350 \times 10^{-4}$ | $-1.6040 \times 10^{-3}$ |
| P2 | −7.5000 | — | — |
| P4 | $-1.0200 \times 10$ | — | — |
| P6 | 1.9500 | — | — |

Figure 30:
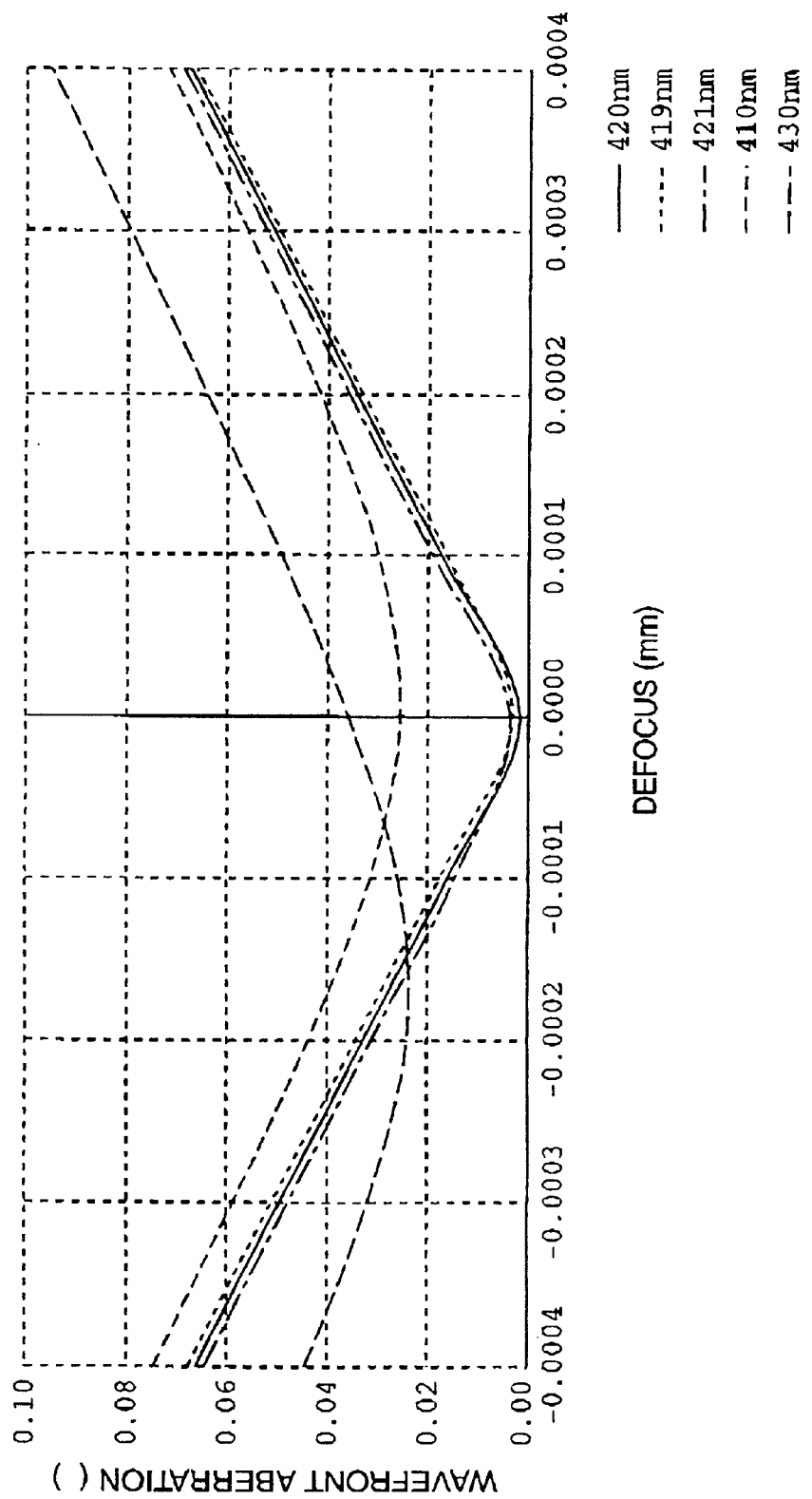
FIG. 30 is a graph showing a relationship between the rms value of the wavefront aberration and defocus in the objective optical system of the eleventh embodiment.

FIG. 29A is a graph showing spherical aberration SA with sine condition SC at wavelength 405 nm when the objective optical system of the eleventh embodiment is applied to the optical disc D1, FIG. 29B is a graph showing chromatic aberration represented by spherical aberration at wavelengths of 420 nm, 419 nm, 421 nm, 410 nm and 430 nm. FIG. 30 is a graph showing a relationship between the rms value of the wavefront aberration and defocus at wavelengths of 420 nm, 419 nm, 421 nm, 410 nm and 430 nm according to the tenth embodiment.

FIG. 29B and FIG. 30 show that the curves of the spherical aberration and the minimum points of the wavefront aberration are in close agreement with one another at the wavelengths except 410 nm and 430 nm. Namely, these graphs make it clear that the lens of the eleventh embodiment is adequately corrected in the chromatic aberration within the wavelength range 419–421 nm.

Twelfth Embodiment

The following TABLE 18 and TABLE 19 shows numerical constructions of an objective optical system of the twelfth embodiment. Since the shape of the objective lens is similar to the seventh embodiment, a drawing of the lens is omitted.

The objective optical system of the twelfth embodiment consists of a chromatic aberration correcting element made of plastic and a refractive lens made of glass. The diffractive lens structure is formed on a first surface of the chromatic aberration correcting element. The objective optical system of the twelfth embodiment is applied to the optical disc D1 having a cover layer of 0.6 mm in thickness and satisfies the conditions (1), (6) and (7).

TABLE 18

λ: 405 nm    f: 2.5 mm    NA: 0.80    v: 95.0

| Surface number | r | d | n | Δn |
|---|---|---|---|---|
| #1 | −60.974 | 0.500 | 1.6223 | −41.0 × 10⁻⁵ |
| #2 | ∞ | 0.500 | — | — |
| #3 | 1.459 | 2.650 | 1.4419 | −7.5 × 10⁻⁵ |
| #4 | −2.016 | 0.739 | — | — |
| #5 | ∞ | 0.600 | 1.6223 | −41.0 × 10⁻⁵ |
| #6 | ∞ | — | — | — |

TABLE 19

| | Correcting element | Refractive lens | |
|---|---|---|---|
| | First surface | First surface | Second surface |
| κ | −1.0000 | −0.6500 | 0.0000 |
| A4 | −8.3303 × 10⁻⁴ | 7.2000 × 10⁻⁴ | 1.1770 × 10⁻¹ |
| A6 | 6.5080 × 10⁻⁵ | −1.9300 × 10⁻⁴ | −1.1200 × 10⁻² |
| A8 | −5.0762 × 10⁻⁵ | 6.8900 × 10⁻⁵ | −9.3250 × 10⁻³ |
| A10 | 0.0000 | −4.8000 × 10⁻⁵ | 4.6600 × 10⁻³ |
| A12 | 0.0000 | 2.1030 × 10⁻⁴ | −7.1240 × 10⁻⁴ |
| P2 | −1.2600 × 10 | A14 −7.2000 × 10⁻⁵ | −1.2200 × 10⁻⁶ |
| P4 | −1.2800 | A16 3.0500 × 10⁻⁷ | 1.8340 × 10⁻⁵ |
| P6 | 1.0000 × 10⁻¹ | A18 4.4750 × 10⁻⁶ | −4.7850 × 10⁻⁶ |
| P8 | −7.8000 × 10⁻² | A20 −7.3290 × 10⁻⁷ | 6.9234 × 10⁻⁷ |

Figure 32:
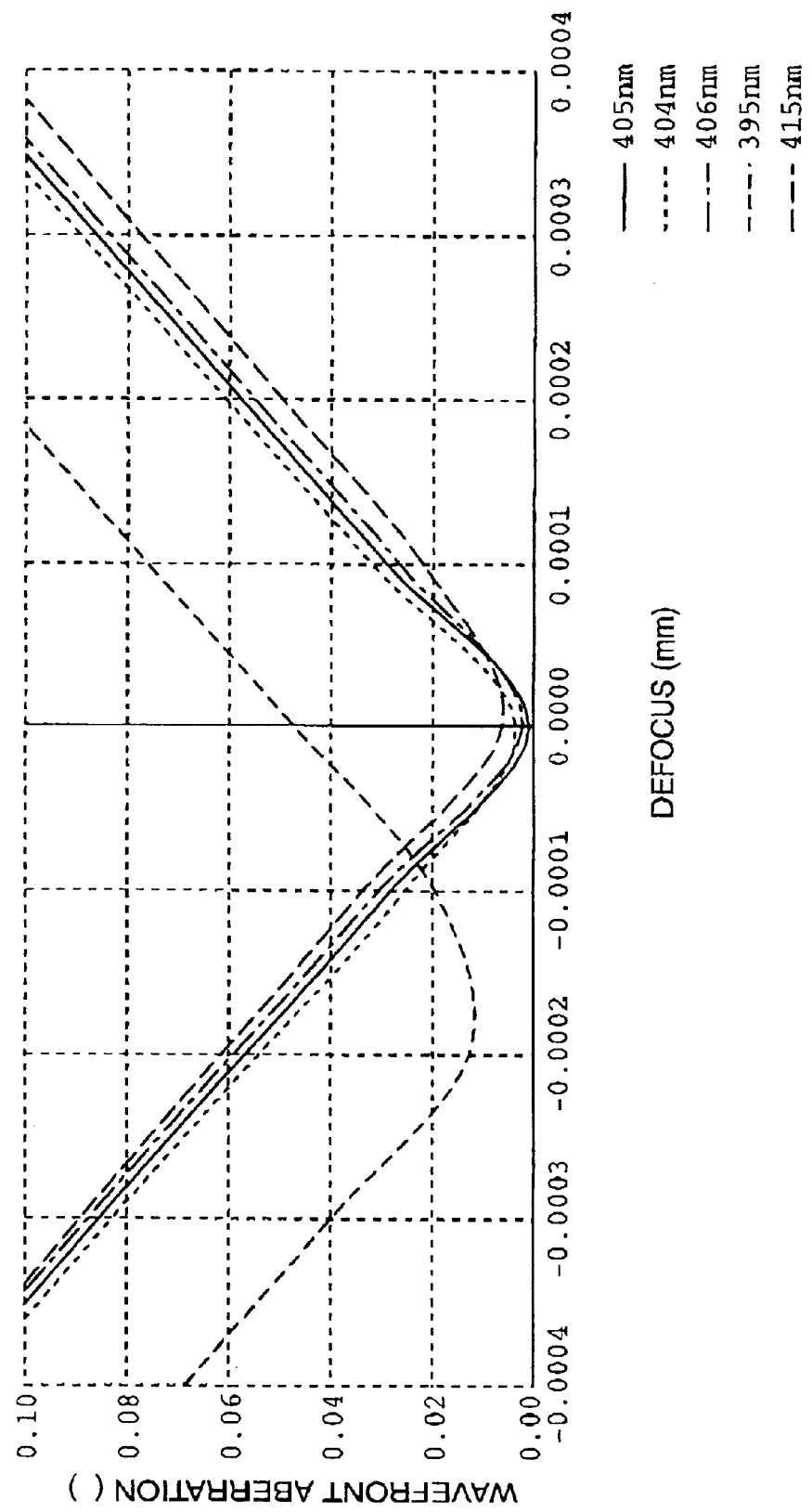
FIG. 32 is a graph showing a relationship between the rms value of the wavefront aberration and defocus in the objective optical system of the twelfth embodiment.

FIG. 31A is a graph showing spherical aberration SA with sine condition SC at wavelength 405 nm when the objective optical system of the twelfth embodiment is applied to the optical disc D1, FIG. 31B is a graph showing chromatic aberration represented by spherical aberration at wavelengths of 405 nm, 404 nm, 406 nm, 395 nm and 415 nm. FIG. 32 is a graph showing a relationship between the rms value of the wavefront aberration and defocus at wavelengths of 405 nm, 404 nm, 406 nm, 395 nm and 415 nm according to the twelfth embodiment.

FIG. 31B and FIG. 32 show that the curves of the spherical aberration and the minimum points of the wavefront aberration are in close agreement with one another at the wavelengths except 395 nm. Namely, these graphs make it clear that the lens of the twelfth embodiment is adequately corrected in the chromatic aberration within the wavelength range 404–415 nm.

Thirteenth Embodiment

FIG. 33 shows an objective optical system of the thirteenth embodiment and an optical disc D3 that does not have a cover layer. The objective optical system of the thirteenth embodiment consists of achromatic aberration correcting element 130 made of plastic and a refractive lens 140 made of glass. The diffractive lens structure is formed on a second surface 132 of the chromatic aberration correcting element 130. The objective optical system of the thirteenth embodiment satisfies the conditions (1), (6) and satisfies the following condition (8).

$$0.0001 < [\{-2 \cdot P_2 \cdot m \cdot (1.0 \times 10^{-6}) f + 1\}^{-1} - \{\Delta nL/(nL-1)\} - 1] \cdot f < 0.0003 \quad (8)$$

The condition (8) defines the diffraction effect caused by the diffractive lens structure when the objective optical system is applied to an optical disc that does not have a cover layer. When the condition (8) is satisfied, the chromatic aberration can be adequately corrected. If the intermediate term is lower than the lower limit of the condition (7), the correcting effect of the diffractive lens structure becomes short. If the intermediate term is larger than the upper limit of the condition (2), the correcting effect of the diffractive lens structure becomes excessive.

The numerical constructions of the thirteenth embodiment are described in TABLE 20 and TABLE 21.

TABLE 20

λ: 405 nm    f: 2.5 mm    NA: 0.60    v: 95.0

| Surface number | r | d | n | Δn |
|---|---|---|---|---|
| #1 | ∞ | 0.500 | 1.6223 | −41.0 × 10⁻⁵ |
| #2 | ∞ | 0.500 | — | — |
| #3 | 1.385 | 1.800 | 1.4419 | −7.5 × 10⁻⁵ |
| #4 | −3.283 | — | — | — |

TABLE 21

| | Correcting element | Refractive lens | |
|---|---|---|---|
| | Second surface | First surface | Second surface |
| κ | −1.0000 | −0.4800 | 0.0000 |
| A4 | −8.4604 × 10⁻⁴ | −7.0000 × 10⁻³ | 5.6800 × 10⁻² |
| A6 | −2.4730 × 10⁻⁴ | −1.2000 × 10⁻⁴ | 1.7960 × 10⁻⁴ |
| A8 | 0.0000 | −1.0200 × 10⁻³ | −1.0200 × 10⁻³ |
| A10 | 0.0000 | 8.4440 × 10⁻⁴ | 1.1110 × 10⁻² |
| A12 | 0.0000 | −4.7000 × 10⁻⁴ | −1.8420 × 10⁻³ |
| P2 | −2.0700 × 10 | — | — |
| P4 | −1.3000 | — | — |
| P6 | −3.8000 × 10⁻¹ | — | — |

Figure 34A:
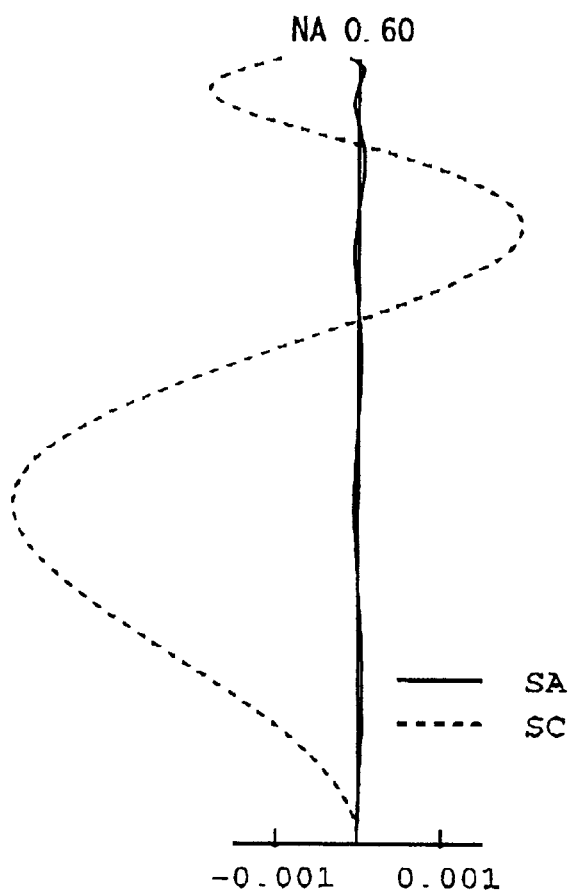
FIGS. 34A and 34B are graphs showing spherical aberration with sine condition and chromatic aberration, respectively, of the objective optical system according to the thirteenth embodiment.
Figure 34B:
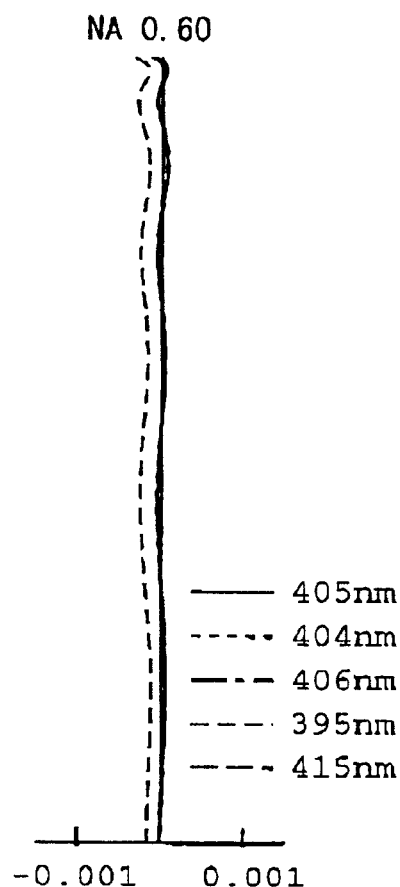
Figure 35:
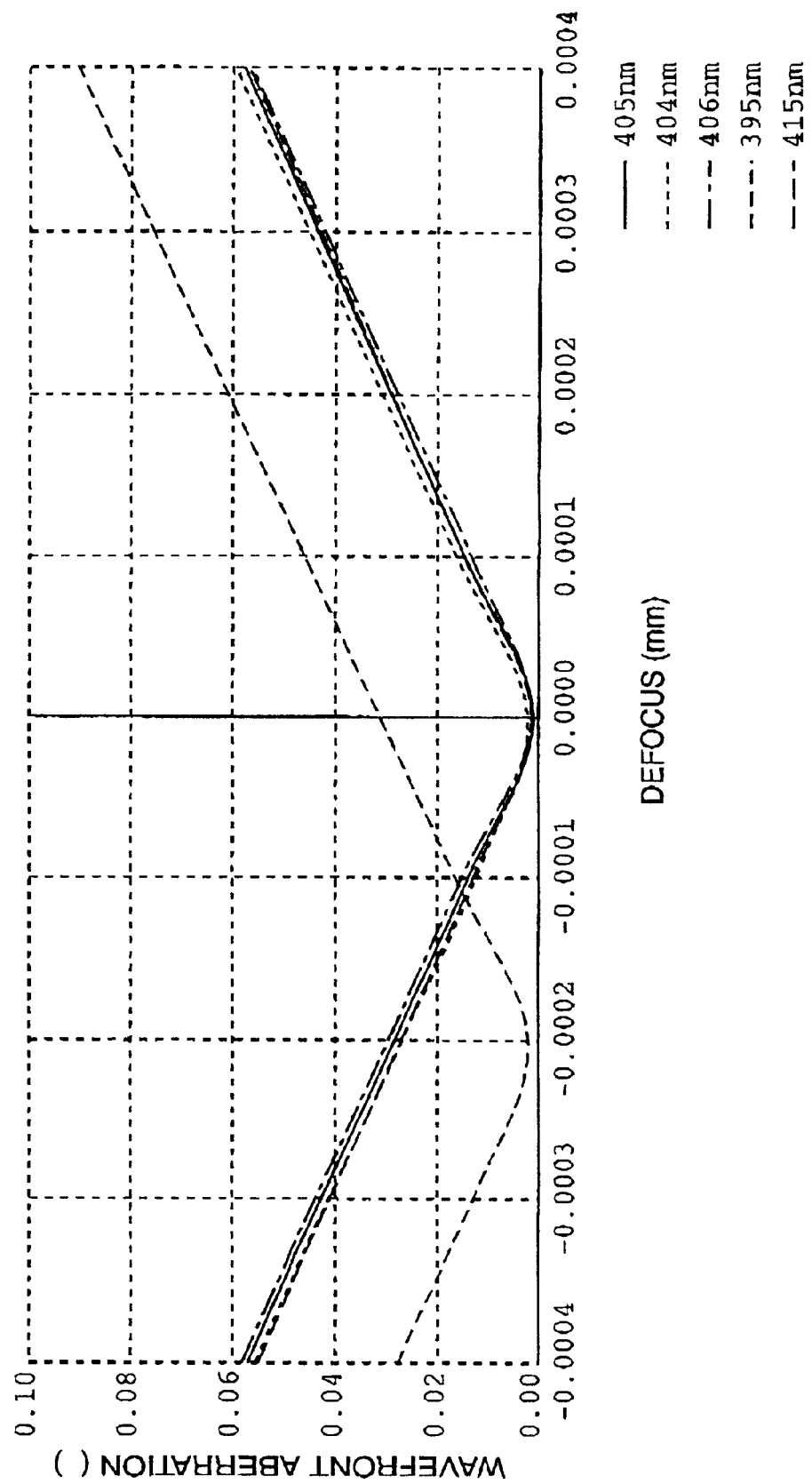
FIG. 35 is a graph showing a relationship between the rms value of the wavefront aberration and defocus in the objective optical system of the thirteenth embodiment.

FIG. 34A is a graph showing spherical aberration SA with sine condition SC at wavelength 405 nm when the objective optical system of the thirteenth embodiment is applied to the optical disc D3, FIG. 34B is a graph showing chromatic aberration represented by spherical aberration at wavelengths of 405 nm, 404 nm, 406 nm, 395 nm and 415 nm. FIG. 35 is a graph showing a relationship between the rms value of the wavefront aberration and defocus at wavelengths of 405 nm, 404 nm, 406 nm, 395 nm and 415 nm according to the thirteenth embodiment.

FIG. 34B and FIG. 35 show that the curves of the spherical aberration and the minimum points of the wavefront aberration are in close agreement with one another at the wavelengths except 395 nm. Namely, these graphs make it clear that the lens of the thirteenth embodiment is adequately corrected in the chromatic aberration within the wavelength range 404–415 nm.

The following TABLE 22 shows the values of the seventh through thirteenth embodiments with respect to the conditions (1), (5), (6), (7) and (8). As described above, the seventh embodiment satisfies the conditions (1), (5) and (7), the eighth through twelfth embodiments satisfy the conditions (1), (6) and (7), and the thirteenth embodiment satisfies the conditions (1), (6) and (8). Therefore, the objective optical systems of all of the embodiments are adequately corrected in the chromatic aberration.

TABLE 22

| | Condition | | |
|---|---|---|---|
| | (1) | (5), (6) | (7), (8) |
| Upper limit | 0.0045 | — | 0.00030 |
| Lower limit | — | 2 or 4 | 0.00010 |

TABLE 22-continued

|  | Condition | | |
|---|---|---|---|
|  | (1) | (5), (6) | (7), (8) |
| Embodiment | | | |
| 7 | 0.0029 | 2.20 | 0.00013 |
| 8 | 0.0029 | 5.47 | 0.00016 |
| 9 | 0.0029 | 5.47 | 0.00014 |
| 10 | 0.0044 | 4.12 | 0.00013 |
| 11 | 0.0044 | 4.12 | 0.00025 |
| 12 | 0.0029 | 5.47 | 0.00017 |
| 13 | 0.0029 | 5.47 | 0.00017 |

The number of the ring-shaped steps of the diffractive lens structure according to the seventh embodiment equals 58 and the minimum width of the ring-shaped step equals 10.3 µm. On the other hand, when a comparative refractive lens is made of plastic whose Abbe number equals 55.8 without changing the remaining conditions of the seventh embodiment, the number of the ring-shaped steps equals 108 and the minimum width of the ring-shaped step equals 5.7 µm in order to obtain the same correcting effect as the seventh embodiment. Therefore, it is important that the refractive lens satisfies the condition (1) to ease the manufacturing and to keep the high diffraction efficiency.

Further, since the chromatic aberration correcting elements of the eighth, ninth, twelfth and thirteenth embodiments are made of plastic whose Abbe number equals 29.9, the correcting effect of the chromatic aberration by the chromatic aberration correcting element as the refractive element becomes larger than the seventh embodiment. As a result, the number of the ring-shaped steps of the diffractive lens structure according to the eighth embodiment equals 52 and the minimum width of the ring-shaped step equals 11.4 µm. While the seventh through thirteenth embodiments satisfy the condition (5), it is preferable to satisfy the condition (6) as the eighth through thirteenth embodiments in order to further ease the manufacturing of the diffractive lens structure and to increase the diffraction efficiency.

As described above, according to the seventh through thirteenth embodiments, since the objective optical system consists of the chromatic aberration correcting element on which the diffractive lens structure is formed and the refractive lens and the refractive lens is formed of material whose rate of change of the refractive index is small, it is possible to provide the objective optical system that is well corrected in the chromatic aberration at wavelength shorter than F-line.

The present disclosure relates to the subject matters contained in Japanese Patent Applications No. 2000-113061 and No. 200-113062, filed on Apr. 14, 2000, which are expressly incorporated herein by reference in their entireties.

What is claimed is:

1. An objective optical system for an optical pick-up that converges a light beam whose wavelength is shorter than F-line onto an information layer of an optical disc, said objective optical system comprising:
a refractive lens, at least one surface of said refractive lens being formed as an aspherical surface whose radius of curvature increases as a height from the optical axis becomes large; and
a diffractive lens structure having a plurality of concentric ring-shaped steps that are formed on at least one lens surface of said refractive lens to correct chromatic aberration caused by said refractive lens, wherein the following condition (1) is satisfied;

$$1/(v^3 \times \lambda \times 10^{-6}) < 0.0045 \quad (1)$$

where $v$ is an Abbe number and $\lambda$ is a working wavelength (unit: nm).

2. The objective optical system according to claim 1, wherein said refractive lens is made of glass.

3. The objective optical system according to claim 1, wherein said objective optical system is applied to an optical disc formation layer is covered by a transparent cover layer, and wherein the conditions (2) and (3) are satisfied;

$$-0.015 < [\Delta nL \cdot fD \cdot f/\{(nL-1) \cdot (fD-f)\} - \Delta nd \cdot td/nd^2] \cdot fD(f \cdot NA/uh\_d)^2/f < -0.007 \quad (2)$$

$$-0.3 < \phi_4/\phi_2 < 0.3 \quad (3)$$

where $\Delta nL$ is the rate of change of the refractive index of said refractive lens represented by the following equation, $$\Delta nL = (nL_{+1} - nL_{-1})/2$$

$nL_{+1}$ is the refractive index of said refractive lens at the wavelength $(\lambda+1)$ nm;

$nL_{-1}$ is the refractive index of said refractive lens at the wavelength $(\lambda-1)$ nm;

$nL$ is the refractive index of said refractive lens at the working wavelength $\lambda$ nm;

$fD$ is the focal length of said diffractive lens structure represented by the following equation, $$fD = -\{1/(2P_2 \times m \times \lambda)\};$$

$P_i$ is a coefficient of i-th order when the additional optical path length $\phi(h)$ added by said diffractive lens structure is expressed by the following equation, $$\phi(h) = (P_0 + P_2 h^2 + P_4 h^4 + P_6 h^6 + \ldots) \times m \times \lambda;$$

$h$ is a height from the optical axis;

$m$ is a diffraction order;

$f$ is the focal length of the objective optical system;

$\Delta nd$ is the rate of change of the refractive index of said cover layer represented by the following equation, $$\Delta nd = (nd_{+1} - nd_{-1})/2$$

$nd_{+1}$ is the refractive index of said cover layer at the wavelength $(\lambda+1)$ nm;

$nd_{-1}$ is the refractive index of said cover layer at the wavelength $(\lambda-1)$ nm;

$td$ is a thickness of said cover layer;

$nd$ is the refractive index of said cover layer at the working wavelength $\lambda$ nm;

NA is a numerical aperture of said objective optical system; and $uh\_d$ is an effective radius of the area within which said diffractive leas structure is formed;

$\phi_2$ and $\phi_4$ are optical path differences represented by the following equations, respectively, $$\phi_2 = P_2 \cdot uh\_d^2 \times m \times \lambda,$$

$$\phi_4 = P_4 \cdot uh\_d^4 \times m \times \lambda.$$

4. The objective optical system according to claim 1, wherein said objective optical system is applied to an optical disc whose information layer is not covered by a cover layer, and wherein the conditions (4) and (3) are satisfied;

$$-0.015 < [\Delta nL \cdot fD \cdot f / \{(nL-1) \times (fD-f)\}] \cdot fD(f \cdot NA/uh\_d)^2/f < -0.007 \quad (4)$$

$$-0.3 < \phi_4/\phi_2 < 0.3 \quad (3)$$

where $\Delta nL$ is the rate of change of the refractive index of said refractive lens represented by the following equation, $$\Delta nL = (nL_{+1} - nL_{-1})/2$$

$nL_{+1}$ is the refractive index of said refractive lens at the wavelength $(\lambda+1)$ nm;

$nL_{-1}$ is the refractive index of said refractive lens at the wavelength $(\lambda-1)$ nm;

$nL$ is the refractive index of said refractive lens at the working wavelength $\lambda$ nm;

$fD$ is the focal length of said diffractive lens structure represented by the following equation, $$fD = -\{1/(2P_2 \times m \times \lambda)\};$$

$P_i$ is a coefficient of i-th order when the additional optical path length $\phi(h)$ added by said diffractive lens structure is expressed by the following equation, $$\phi(h) = (P_0 + P_2 h^2 + P_4 h^4 + P_6 h^6 + \ldots) \times m \times \lambda;$$

h is a height from the optical axis;

m is a diffraction order;

f is the focal length of the objective optical system;

NA is a numerical aperture of said objective optical system; and uh__d is an effectlve radius of the area within which said diffractive lens structure is formed;

$\phi_2$ and $\phi_4$ are optical path differences represented by the following equations, respectively, $$\phi_2 = P_2 \cdot uh\_d^2 \times m \times \lambda,$$

$$\phi_4 = P_4 \cdot uh\_d^4 \times m \times \lambda.$$

5. An objective optical system for an optical pick-up that converges a light beam whose wavelength is shorter than F-line onto an information layer of an optical disc, said objective optical system comprising:

a refractive lens that is a single glass lens, at least one surface of said refractive lens being forxmed as an aspherical surface whose radius of curvature increases as a height from the optical axis becomes large; and a chromatic aberration correcting element that is made of plastic, a diffractive lens structure having a plurality of concentric ring-shaped steps being formed on at least one surface of said chromatic aberration correcting element to correct chromatic aberration caused by said refractive lens, wherein said refractive lens satisfies the following condition (1):

$$1/(\nu^3 \times \lambda \times 10^{-6}) < 0.0045 \quad (1)$$

where $\nu$ is an Abbe number of the refractive lens and $\lambda$ is a working wavelength.

6. The objective optical system according to claim 5, wherein said chromatic aberration correcting element has no power at the working wavelength $\lambda$, and wherein the following condition (5) is satisfied:

$$|\Delta nC/\Delta nL| > 2 \quad (5)$$

where $\Delta nC$ is the rate of change of the refractive index of said chromatic aberration correcting element represented by the following equation, $$\Delta nC = (nC_{+1} - nC_{-1})/2$$

$nC_{+1}$ is the refractive index of said chromatic aberration correcting element at the wavelength $(\lambda+1)$ nm;

$nC_{-1}$ is the refractive index of said chromatic aberration correcting element at the wavelength $(\lambda-1)$ nm;

$\Delta nL$ is the rate of change of the refractive index of said refractive lens represented by the following equation, $$\Delta nL = (nL_{+1} - nL_{-1})/2$$

$nL_{+1}$ is the refractive index of said refractive lens at the wavelength $(\lambda+1)$ nm; and $nL_{+1}$ is the refractive index of said refractive lens at the wavelength $(\lambda-1)$ nm.

7. The objective optical system according to claim 6, wherein the following condition (6) is satisfied;

$$|\Delta nC/\Delta nL| > 4 \quad (6)$$

8. The objective optical system according to claim 5, wherein said refractive lens is located between said chromatic aberration correcting element and said optical disc.

9. The objective optical system according to claim 5, wherein said objective optical system is applied to an optical disc whose information layer is covered by a transparent cover layer, and wherein the condition (7) is satisfied;

$$0.0001 < [\{-2 \cdot P_2 \cdot m \cdot (1.0 \times 10^{-6}) f + 1\}^{-1}$$

$$-\{\Delta nL/(nL-1)\} - 1] \cdot f + \Delta nd \cdot td/nd^2 < 0.0003 \quad (7)$$

where $P_2$ is a coefficient of second order when the additional optical path length $\phi(h)$ added by said diffractive lens structure is expressed by the following equation, $$\phi(h) = (P_0 + P_2 h^2 + P_4 h^4 + P_6 h^6 + \ldots) \times m \times \lambda;$$

h is a height from the optical axis;

m is a diffraction order;

f is the focal length of the objective optical system;

$\Delta nL$ is the rate of change of the refractive index of said refractive lens represented by the following equation, $$\Delta nL = (nL_{+1} - nL_{-1})/2$$

$nL_{+1}$ is the refractive index of said refractive lens at the wavelength $(\lambda+1)$ nm;

$nL_{-1}$ is the refractive index of said refractive lens at the wavelength $(\lambda-1)$ nm;

$nL$ is the refractive index of said refractive lens at the working wavelength $\lambda$ nm;

$\Delta nd$ is the rate of change of the refractive index of said cover layer represented by the following equation, $$\Delta nd = (nd_{+1} - nd_{-1})/2$$

$nd_{+1}$ is the refractive index of said cover layer at the wavelength ($\lambda$+1) nm;

$nd_{-1}$ is the refractive index of said cover layer at the wavelength ($\lambda$−1) nm;

td is a thickness of said cover layer; and nd is the refractive index of said cover layer at the working wavelength $\lambda$ nm.

10. The objective optical system according to claim 5, wherein said objective optical system is applied to an optical disc whose information layer is not covered by a cover layer, and wherein the conditions (8) is satisfied;

$$0.0001 < [\{-2 \cdot P_2 \cdot m \cdot (1.0 \times 10^{-6})f+1\}^{-1} - \{\Delta nL/(nL-1)\}-1] f < 0.0003 \quad (8)$$

where $P_2$ is a coefficient of second order when the additional optical path length $\phi(h)$ added by said diffractive lens structure is expressed by the following equation, $$\phi(h) = (P_0 + P_2 h^2 + P_4 h^4 + P_6 h^6 + \ldots) \times m \times \lambda;$$

h is a height from the optical axis;

m is a diffraction order;

f is the focal length of the objective optical system;

$\Delta nL$ is the rate of change of the refractive index of said refractive lens represented by the following equation, $$\Delta nL = (nL_{+1} - nL_{-1})/2$$

$nL_{+1}$ is the refractive index of said refractive lens at the wavelength ($\lambda$+1) nm;

$nL_{-1}$ is the refractive index of said refractive lens at the wavelength ($\lambda$−1) nm; and nL is the refractive index of said refractive lens at the working wavelength $\lambda$ nm.

* * * * *